United States Patent
Narayan et al.

(10) Patent No.: US 7,477,710 B2
(45) Date of Patent: Jan. 13, 2009

(54) SYSTEMS AND METHODS FOR ANALOG TO DIGITAL CONVERSION WITH A SIGNAL CANCELLATION SYSTEM OF A RECEIVER

(75) Inventors: Anand P. Narayan, Boulder, CO (US); Eric S. Olson, Milwaukee, WI (US); John K. Thomas, Erie, CO (US)

(73) Assignee: Tensorcomm, Inc, Greenwood Village, CO (US)

( * ) Notice: Subject to any disclaimer, the term of this patent is extended or adjusted under 35 U.S.C. 154(b) by 799 days.

(21) Appl. No.: 11/005,679

(22) Filed: Dec. 7, 2004

(65) Prior Publication Data

US 2005/0163039 A1  Jul. 28, 2005

Related U.S. Application Data

(63) Continuation-in-part of application No. 10/773,777, filed on Feb. 6, 2004, now Pat. No. 7,394,879, and a continuation-in-part of application No. 10/763,346, filed on Jan. 23, 2004, now Pat. No. 7,039,136, and a continuation-in-part of application No. 10/935,669, filed on Sep. 7, 2004, and a continuation-in-part of application No. 10/935,015, filed on Sep. 7, 2004.

(51) Int. Cl.
*H04B 1/10* (2006.01)

(52) U.S. Cl. ............................. 375/349; 375/150
(58) Field of Classification Search ......... 375/130–150, 375/349
See application file for complete search history.

(56) References Cited

U.S. PATENT DOCUMENTS

| | | |
|---|---|---|
| 3,742,201 A | 6/1973 | Groginsky |
| 4,088,955 A | 5/1978 | Baghdady |
| 4,309,769 A | 1/1982 | Taylor, Jr. |
| 4,359,738 A | 11/1982 | Lewis |
| 4,601,046 A | 7/1986 | Halpern |
| 4,665,401 A | 5/1987 | Garrard et al. |
| 4,670,885 A | 6/1987 | Parl et al. |
| 4,713,794 A | 12/1987 | Byington et al. |

(Continued)

FOREIGN PATENT DOCUMENTS

DE  4201439 A1  7/1993

(Continued)

OTHER PUBLICATIONS

Mitra, et al., Adaptive Decorrelating Detectors for CDMA Systems, Accepted for Wireless Communications Journal, Accepted May 1995.

(Continued)

*Primary Examiner*—Emmanuel Bayard
(74) *Attorney, Agent, or Firm*—Anand P. Narayan

(57) ABSTRACT

The present invention provides systems and methods for signal cancellation with a receiver. The receiver comprises a discretizer configured for generating digital signals at different resolutions from a received analog signal. Processing fingers of the receiver generate spreading codes from at least one of the digital signals while a Coded Signal Processing Engine ("CSPE") substantially cancels interference from at least another one of the digital signals. The spreading codes are transferred to the CSPE where they may be used to construct an interference matrix. One or more cancellation operators may be generated and subsequently applied to the digital signal(s) input to the CSPE to substantially cancel the interference therefrom. The CSPE may adjust the number of bits of the substantially interference cancelled signal(s) to meet a requisite bit width or dynamic range of the receiver. The substantially cancelled signal(s) is then transferred to the processing fingers for further processing.

48 Claims, 11 Drawing Sheets

U.S. PATENT DOCUMENTS

| | | |
|---|---|---|
| 4,780,885 A | 10/1988 | Paul et al. |
| 4,856,025 A | 8/1989 | Takai |
| 4,893,316 A | 1/1990 | Janc et al. |
| 4,922,506 A | 5/1990 | McCallister et al. |
| 4,933,639 A | 6/1990 | Barker |
| 4,965,732 A | 10/1990 | Roy, III et al. |
| 5,017,929 A | 5/1991 | Tsuda |
| 5,099,493 A | 3/1992 | Zeger et al. |
| 5,105,435 A | 4/1992 | Stilwell |
| 5,109,390 A | 4/1992 | Gilhousen et al. |
| 5,119,401 A | 6/1992 | Tsujimoto |
| 5,136,296 A | 8/1992 | Roettger et al. |
| 5,151,919 A | 9/1992 | Dent |
| 5,218,359 A | 6/1993 | Minamisono |
| 5,218,619 A | 6/1993 | Dent |
| 5,220,687 A | 6/1993 | Ichikawa et al. |
| 5,224,122 A | 6/1993 | Bruckert |
| 5,237,586 A | 8/1993 | Bottomley |
| 5,263,191 A | 11/1993 | Dickerson |
| 5,280,472 A | 1/1994 | Gilhousen et al. |
| 5,305,349 A | 4/1994 | Dent |
| 5,325,394 A | 6/1994 | Bruckert |
| 5,343,493 A | 8/1994 | Karimullah |
| 5,343,496 A | 8/1994 | Honig et al. |
| 5,347,535 A | 9/1994 | Karasawa et al. |
| 5,353,302 A | 10/1994 | Bi |
| 5,377,183 A | 12/1994 | Dent |
| 5,386,202 A | 1/1995 | Cochran et al. |
| 5,390,207 A | 2/1995 | Fenton et al. |
| 5,394,110 A | 2/1995 | Mizoguchi |
| 5,396,256 A | 3/1995 | Chiba et al. |
| 5,437,055 A | 7/1995 | Wheatley, III |
| 5,440,265 A | 8/1995 | Cochran et al. |
| 5,448,600 A | 9/1995 | Lucas |
| 5,481,570 A | 1/1996 | Winters |
| 5,506,865 A | 4/1996 | Weaver, Jr. |
| 5,513,176 A | 4/1996 | Dean et al. |
| 5,533,011 A | 7/1996 | Dean et al. |
| 5,553,098 A | 9/1996 | Cochran et al. |
| 5,602,833 A | 2/1997 | Zehavi |
| 5,644,592 A | 7/1997 | Divsalar |
| 5,736,964 A | 4/1998 | Ghosh et al. |
| 5,787,130 A | 7/1998 | Kotzin et al. |
| 5,844,521 A | 12/1998 | Stephens et al. |
| 5,859,613 A | 1/1999 | Otto |
| 5,872,540 A | 2/1999 | Casabona |
| 5,872,776 A | 2/1999 | Yang |
| 5,894,500 A | 4/1999 | Bruckert et al. |
| 5,926,761 A | 7/1999 | Reed et al. |
| 5,930,229 A | 7/1999 | Yoshida et al. |
| 5,953,369 A | 9/1999 | Suzuki |
| 5,978,413 A | 11/1999 | Bender |
| 5,995,499 A | 11/1999 | Hottinen et al. |
| 6,002,727 A | 12/1999 | Uesugi |
| 6,014,373 A | 1/2000 | Schilling et al. |
| 6,018,317 A | 1/2000 | Dogan et al. |
| 6,032,056 A | 2/2000 | Reudink |
| 6,088,383 A | 7/2000 | Suzuki et al. |
| 6,101,385 A | 8/2000 | Monte et al. |
| 6,104,712 A | 8/2000 | Robert et al. |
| 6,115,409 A | 9/2000 | Upadhyay et al. |
| 6,127,973 A | 10/2000 | Choi et al. |
| 6,131,013 A | 10/2000 | Bergstrom et al. |
| 6,137,788 A | 10/2000 | Sawahashi et al. |
| 6,141,332 A | 10/2000 | Lavaen |
| 6,154,443 A | 11/2000 | Huang et al. |
| 6,157,685 A | 12/2000 | Tanaka et al. |
| 6,157,842 A | 12/2000 | Kaisson et al. |
| 6,157,847 A | 12/2000 | Buehrer et al. |
| 6,163,696 A | 12/2000 | Bi et al. |
| 6,166,690 A | 12/2000 | Lin et al. |
| 6,172,969 B1 | 1/2001 | Kawakami et al. |
| 6,175,587 B1 | 1/2001 | Madhow et al. |
| 6,192,067 B1 | 2/2001 | Toda et al. |
| 6,201,799 B1 | 3/2001 | Huang et al. |
| 6,215,812 B1 | 4/2001 | Young et al. |
| 6,219,376 B1 | 4/2001 | Zhodzishsky et al. |
| 6,222,828 B1 | 4/2001 | Ohlson et al. |
| 6,230,180 B1 | 5/2001 | Mohamed |
| 6,233,229 B1 | 5/2001 | Ranta et al. |
| 6,233,459 B1 | 5/2001 | Sullivan et al. |
| 6,240,124 B1 | 5/2001 | Wiedeman et al. |
| 6,252,535 B1 | 6/2001 | Kober et al. |
| 6,256,336 B1 | 7/2001 | Rademacher et al. |
| 6,259,688 B1 | 7/2001 | Schilling et al. |
| 6,263,208 B1 | 7/2001 | Chang et al. |
| 6,266,529 B1 | 7/2001 | Chheda |
| 6,275,186 B1 | 8/2001 | Kong |
| 6,278,726 B1 | 8/2001 | Mesecher et al. |
| 6,282,231 B1 | 8/2001 | Norman et al. |
| 6,282,233 B1 | 8/2001 | Yoshida |
| 6,285,316 B1 | 9/2001 | Nir et al. |
| 6,285,319 B1 | 9/2001 | Rose |
| 6,285,861 B1 | 9/2001 | Bonaccorso et al. |
| 6,301,289 B1 | 10/2001 | Bejjani et al. |
| 6,304,618 B1 | 10/2001 | Hafeez et al. |
| 6,308,072 B1 | 10/2001 | Labedz et al. |
| 6,310,704 B1 | 10/2001 | Dogan et al. |
| 6,317,453 B1 | 11/2001 | Chang |
| 6,321,090 B1 | 11/2001 | Soliman |
| 6,324,159 B1 | 11/2001 | Mennekens et al. |
| 6,327,471 B1 | 12/2001 | Song |
| 6,330,460 B1 | 12/2001 | Wong et al. |
| 6,333,947 B1 | 12/2001 | van Heeswyk et al. |
| 6,351,235 B1 | 2/2002 | Stilp |
| 6,351,642 B1 | 2/2002 | Corbett et al. |
| 6,359,874 B1 | 3/2002 | Dent |
| 6,362,760 B2 | 3/2002 | Kober et al. |
| 6,363,104 B1 | 3/2002 | Bottomley |
| 6,377,636 B1 | 4/2002 | Paulraj et al. |
| 6,380,879 B2 | 4/2002 | Kober et al. |
| 6,385,264 B1 | 5/2002 | Terasawa |
| 6,396,804 B2 | 5/2002 | Odenwalder |
| 6,404,760 B1 | 6/2002 | Holtzman et al. |
| 6,430,216 B1 | 8/2002 | Kober et al. |
| 6,459,693 B1 | 10/2002 | Park et al. |
| 6,501,788 B1 | 12/2002 | Wang |
| 6,515,980 B1 | 2/2003 | Bottomley |
| 6,570,909 B1 | 5/2003 | Kansakoski |
| 6,574,270 B1 | 6/2003 | Madkour |
| 6,580,771 B2 | 6/2003 | Kenney |
| 6,584,115 B1 | 6/2003 | Suzuki |
| 6,590,888 B1 | 7/2003 | Ohshima |
| 6,680,727 B2 | 1/2004 | Butler |
| 6,798,737 B1 | 9/2004 | Dabak |
| 6,801,565 B1 | 10/2004 | Bottomley |
| 2001/0003443 A1 | 6/2001 | Velazquez et al. |
| 2001/0020912 A1 | 9/2001 | Naruse et al. |
| 2001/0021646 A1 | 9/2001 | Antonucci et al. |
| 2001/0046266 A1 | 11/2001 | Rakib et al. |
| 2002/0001299 A1 | 1/2002 | Petch et al. |
| 2002/0051433 A1 | 5/2002 | Affes et al. |
| 2002/0061752 A1* | 5/2002 | Kurokami ............... 455/447 |
| 2002/0172173 A1 | 11/2002 | Schilling et al. |
| 2002/0176488 A1 | 11/2002 | Kober et al. |
| 2002/0183028 A1* | 12/2002 | Takahashi et al. ........ 455/232.1 |
| 2003/0053526 A1 | 3/2003 | Reznik |
| 2003/0091104 A1* | 5/2003 | Yellin ................ 375/148 |
| 2004/0127179 A1* | 7/2004 | Sasaki ................ 455/146 |

| | | | |
|---|---|---|---|
| 2006/0233224 A1* | 10/2006 | Lotter et al. | 375/148 |
| 2007/0248200 A1* | 10/2007 | Aoki et al. | 375/349 |

FOREIGN PATENT DOCUMENTS

| | | |
|---|---|---|
| DE | 4326843 A1 | 2/1995 |
| DE | 4343959 A1 | 6/1995 |
| EP | 0558910 A1 | 1/1993 |
| EP | 0610989 A2 | 1/1994 |
| GB | 2280575 A | 2/1995 |
| JP | 2000-13360 A | 1/2000 |
| WO | WO 93/12590 | 6/1995 |

OTHER PUBLICATIONS

Schneider, Optimum Detection of Code Division Multiplexed Signals, IEEE Transactions on Aerospace and Electronic Systems, Jan. 1979, vol. AES-15 No. 1.

Mitra, et al., Adaptive Receiver Algorithms for Near-Far Resistance CDMA, IEEE Transactions of Communications, Apr. 1995.

Lupas, et al. Near-Far Resistance of Multiuser Detectors in Asynchronous Channels, IEEE Transactions on Communications, Apr. 1990, vol. 38, No. 4.

Lupas, et al., Linear Multiuser Detectors for Synchronous Code-Division Multiple-Access Channels, IEEE Transactions on Information Theory, Jan. 1989, vol. 35, No. 1.

Kohno, et al., Cancellation Techniques of Co-Channel Interference in Asynchronous Spread Spectrum Multiple Access Systems, May 1983, vol. J 56-A. No. 5.

Garg, et al., Wireless and Personal Communications Systems, 1996, pp. 79-151, Prentice Hall, Upper Saddle River, NJ, US.

Cheng, et al., Spread-Spectrum Code Acquisition in the Presence of Doppler Shift and Data Modulation, IEEE Transactions on Communications, Feb. 1990, vol. 38, No. 2.

Behrens et al., Parameter Estimation in the Presence of Low Rank Noise, pp. 341-344, Maple Press, 1988.

Best, Phase-Locked Loops—Design, Simulation, and Applications, pp. 251-287, McGraw-Hill, 1999.

Iltis, Multiuser Detection of Quasisynchronous CDMA Signals Using Linear Decorrelators, IEEE Transactions on Communications, Nov. 1996, vol. 44, No. 11.

Rappaport, Wireless Communications—Principles & Practice, 1996, pp. 518-533, Prentice Hall, Upper Saddle River, NJ, US.

Scharf, et al., Matched Subspace Detectors, IEEE Transactions on Signal Processing, Aug. 1994, vol. 42, No. 8.

Price et al., A Communication Technique for Multipath Channels, Proceedings to the IRE, 1958, vol. 46, The Institute of Radio Engineers, New York, NY, US.

Affes et al., Interference Subspace Rejection: A Framework for Multiuser Detection in Wideband CDMA, IEEE Journal on Selected Areas in Communications, Feb. 2002, vol. 20, No. 2.

Schlegel et al., Coded Asynchronous CDMA and Its Efficient Detection, IEEE Transactions on Information Theory, Nov. 1998, vol. 44, No. 7.

Xie et al., A family of Suboptimum Detectors for Coherent Multiuser Communications, IEEE Journal on Selected Areas in Communications, May 1990, vol. 8, No. 4.

Viterbi, Very Low Rate Convolutional Codes for Maximum Theoretical Performance of Spread Spectrum Multiple-Access Channels, IEEE Journal on Selected Areas in Communications, May 1990, vol. 8, No. 4.

Viterbi, CDMA—Principles of Spread Spectrum Communication, 1995, pp. 11-75 and 179-233, Addison-Wesley, Reading, MA, US.

Verdu, Mimimum Probability of Error for Asynchronous Gaussian Multiple-Access Channels, IEEE Transactions on Information Theory, Jan. 1986, vol. IT-32, No. 1.

Kaplan, Understanding GPS—Principles and Applications, 1996, pp. 83-236, Artech House, Norwood, MA, US.

Scharf, Statistical Signal Processing—Detection, Estimation, and Time Series Analysis, 1990, pp. 23-75 and 103-178, Addison-Wesly, Reading, MA, US.

Stimson, Introduction to Airborne Radar 2nd edition, 1998, pp. 163-176 and 473-491, SciTech Publishing, Mendham, NJ, US.

Behrens et al., Signal Processing Applications of Oblique Projection Operators, IEEE Transactions on Signal Processing, Jun. 1994, vol. 42, No. 6.

Alexander et al., A Linear Receiver for Coded Multiuser CDMA, IEEE Transactions on Communications, May 1997, vol. 45, No. 5.

Schlegel et al., Multiuser Projection Receivers, IEEE Journal on Selected Areas in Communications, Oct. 1996, vol. 14, No. 8.

Halper et al., Digital-to-Analog Conversio n by Pulse-Count Modulation Methods, IEEE Transactions on Instrumentation and M easurement, Aug. 1996, vol. 45, No. 4.

Ortega et al., Analog to Digital and Digital to Analog Conversion Based on Stochastic Logic, IEEE 0-7803-3026-9/95, 1995.

Frankel et al., High-performance photonic analogue digital converter, Electronic Letters, Dec. 4, 1997, vol. 33, No. 25.

Lin et al., Digital Filters for High Performance Audio Delta-sigma Analog-to-digital and Digital-to-analog Conversions, Proceedings of ICSP, Crystal Semiconductor Corporation, 1996, Austin, TX, US.

Thomas, Thesis for the Doctor of Philosophy Degree, UMI Dissertation Services, Jun. 1996, Ann Arbor, MI, US.

Schlegel et al., Projection Receiver: A New Efficient Multi-User Detector, IEEE, 1995, 0-7803-2509-5/95.

Behrens, Subspace Signal Processing in Structured Noise, UMI Dissertation Services, Jun. 1990, Ann Arbor, MI, US.

* cited by examiner

SYSTEMS AND METHODS FOR ANALOG TO DIGITAL CONVERSION WITH A SIGNAL CANCELLATION SYSTEM OF A RECEIVER

CROSS-REFERENCE TO RELATED APPLICATIONS

This application is a continuation-in-part of commonly owned and U.S. patent application Ser. Nos. 10/773,777 (filed Feb. 6, 2004 now U.S. Pat. No. 7,394,879; the "'777 application"), 10/763,346 (filed Jan. 23, 2004 now U.S. Pat. No. 7,039,136; the "'346 application"), 10/935,669 (filed Sep. 7, 2004; the "'669 application") and Ser. No. 10/935,015 (filed Sep. 7, 2004; the "'015 application"), which are all hereby incorporated by reference.

BACKGROUND OF THE INVENTION

1. Field of the Invention

This invention generally relates to Analog to Digital ("A/D") conversion. More specifically, the invention relates to a plurality of A/D conversions in which at least one of the A/D conversions is operable with a signal cancellation system of a receiver. Such a system may be particularly beneficial to communications employing Code Division Multiple Access ("CDMA"), Wideband CDMA, Broadband CDMA, ("UMTS"), Global Positioning System ("GPS") and combinations thereof.

2. Discussion of the Related Art

Interference in communications obstructs the intended reception of a signal and is a persistent problem. Interference may exist in many forms. In CDMA communications, for example, interference is typically the result of receiving one or more unwanted signals simultaneously with a selected signal. These unwanted signals may be similar to that of the selected signal and may therefore disrupt the reception of the selected signal. This disruption of the selected signal may corrupt data retrieval processes of a selected signal. Such problems are typical in CDMA telephony systems.

In CDMA telephony, a communications system typically includes a plurality of "base station" transceivers providing a coverage area within a geographic region. These base stations communicate with mobile telephones and/or other CDMA devices operating within the coverage area. To illustrate, a base station provides a coverage "cell" within the overall communication coverage area maintained by the communications system. While within a particular cell, a mobile telephone can communicate with the base station providing the coverage for that cell. As the mobile telephone moves to the cell of another base station, communications between the mobile telephone and the base station providing the initial cell coverage can be transferred via a "hand off" to the other base station. Typically, CDMA cells have overlapping coverage.

Each base station within a CDMA telephony system uses coded signals to communicate with mobile telephones. For example, typical CDMA telephony systems use pseudorandom number, or pseudo-noise, ("PN") spreading codes, occasionally referred to as "short codes," to encode data signals. These encoded data signals are transmitted to and from mobile telephones to convey digitized voice and/or other forms of digital communication. PN codes are known to those skilled in the art.

To encode the data signals, the base station applies a short code to the data at a rate that is faster than that of the symbol rate. For example, the short code is applied to the data such that there are multiple "chips" of the code for any given symbol of data. Such an application of the short code is commonly referred to as direct sequence spreading of the data. Chips and their associated chipping rates are known to those skilled in the art.

Often, each base station is assigned a particular timing offset of the short code to differentiate between base stations. Mobile telephones may therefore determine the identity of a particular base station based on the timing offset of the short code. Additionally, the data signals are often further encoded with a unique "covering" code. Such covering codes provide "channelization" for a signal that increases the probability of data recovery of a selected signal. For example, data encoded with a covering code can further differentiate signals thereby improving detection and subsequent processing of a selected signal.

These covering codes are often used in CDMA telephony systems and typically include families of codes that are orthogonal (e.g., a Walsh code) or codes that are substantially orthogonal (e.g., a quasi-orthogonal function ("QOF")). Orthogonal and substantially orthogonal covering codes have properties that allow for the differentiation of unwanted signals and are known to those skilled in the art. Walsh codes and QOF codes are known to those skilled in the art.

Both the short codes and the covering codes assist in the detection, acquisition, tracking and data recovery of a selected signal. However, interference caused by other signals may still degrade data recovery of the selected signal. For example, as a mobile telephone communicates with a particular base station within the coverage cell of that base station, communication to and from other base stations can interfere with the mobile telephone communication. Since cells often overlap one another to ensure that all desired geographic regions are included in the coverage area of the communication system, one or more signals to and from one base station may interfere with the communication link, or "channel," between the mobile telephone and another base station. This effect is commonly referred to as cross-channel interference.

Still, other forms of interference may occur from "multipath" copies of a selected signal. Multipath can create interference due to the reception of multiple copies of a selected signal at differing times. Multipath typically occurs because of obstructions, such as buildings, trees, et cetera, that create multiple transmission paths for a selected signal. These separate transmission paths may have unique distances that cause the signal to arrive at a receiver at differing times and is commonly referred to as co-channel interference. Additionally, the effects of these separate paths may bleed over into other cells to cause cross-channel interference.

Multipath creates co-channel interference because, among other reasons, the orthogonality of the covering codes for a received signal is essentially lost due to timing offsets associated with the multipath. For example, a multipath signals arriving at a receiver at differing times cause a misalignment of the covering code. Such a misalignment can result in a high cross-correlation between covering codes and a reduction in the ability to correctly retrieve conveyed data.

"Rake" receivers, such as those used in CDMA telephony systems, can assist in countering interfering effects caused by multipath. For example, a rake receiver may have a plurality of "fingers," wherein each finger of the rake receiver independently estimates channel gain and other signal characteristics (e.g., phase) of the selected signal to more accurately demodulate data of the selected signal and subsequently retrieve the data. Each finger is assigned a particular "path" of the selected signal (i.e., one of the paths of a transmitted signal that comprises multipath signals). Additionally, as signal characteristics change, the fingers may be assigned or de-assigned to other "paths" of the signal to improve data retrieval.

FIG. 1 illustrates a block diagram of a prior art rake receiver 100. Rake receiver 100 is configured for receiving an analog radio signal and converting that radio signal to a digital signal in the receiver front-end 110. The digital signal is subsequently processed by the rake receiver (i.e., by among other things processing fingers $104_1 \ldots _P$, where "P" is an integer greater than one) to extract data and/or voice from the digital signal.

The digital signal is transferred to searcher finger 103, which detects a signal path that is subsequently assigned to a processing finger 104 for tracking and demodulation. Each processing finger 104 is assigned a unique signal path to process the signal of interest ("SOI") of the received signal. For example, each processing finger 104 may track a signal path that comprises a plurality of channels. The processing finger may then demodulate a particular channel for subsequent combining and processing.

Combiner 105 combines the processed signals from processing fingers 104 to improve an estimate of the SOI. For example, combiner 105 may perform maximal ratio combining ("MRC") of the demodulated signals produced by each of the processing fingers 104. This combining may improve the signal quality of the SOI estimate and is subsequently processed by the rake receiver 100 to extract data and/or voice. Extraction of the data and/or voice is performed by descrambler 106, deinterleaver 107 and decoder 108 of rake receiver 100. Such descrambling, deinterleaving and decoding is well-known to those skilled in the art.

Prior to descrambling, deinterleaving and decoding of the SOI, rake receiver 100 converts the received analog radio signal to a digital signal. Rake receiver 100 uses a receiver front-end 110 that comprises a downconverter 101 and discretizer 102 to convert the received radio signal to a digital signal. Downconverter 101 receives the analog radio signal, down converts that signal to a baseband signal and low pass filters the baseband signal. The filtered baseband signal is transferred to discretizer 102 for A/D conversion of the baseband signal and subsequent amplitude adjustment and scaling of the resultant digital signal. Upon conversion of the radio signal by receiver front-end 110, the resultant digital signal is transferred to searcher finger 103 and/or processing finger 104 for the processing described hereinabove.

FIG. 2 illustrates a block diagram of prior art rake receiver front-end 110. Rake receiver front-end 110 comprises down converter 101 and discretizer 102 of FIG. 1. The prior art receiver front-end 110 is configured for receiving an analog radio signal and down converting and discretizing that signal to a baseband digital signal.

Down converter 101 comprises baseband converter 201 and low pass filter ("LPF") 202. Baseband down converter 201 receives the analog radio signal and down converts the signal to baseband as is well known to those skilled in the art. Also well-known to those skilled in the art is the subsequent low pass filtering (i.e., by LPF 202) of the baseband signal. The low pass filtered baseband signal is transferred to discretizer 102 wherein the signal is digitized by A/D converter 203.

Once the signal is digitized by A/D converter 203, the digital signal is transferred to a gain controller 204 for amplitude adjustment and scaling. Typically, the gain controller is an Automatic Gain Controller ("AGC") that receives the digital signal and automatically adjusts the amplitude of the signal based on a requisite dynamic range of the receiver. The amplitude adjusted signal is then transferred to a searcher finger and/or a processing finger, such as searcher finger 103 and processing finger 104 of FIG. 1, for further processing as described hereinabove. A/D converters and gain controllers (e.g., AGCs) are well-known to those skilled in the art.

The allocated number of bits (i.e., bit width) produced in the AGC of prior art rake receivers as a representation of the received signal is a trade-off between accuracy in data recovery and processing limitations. These rake receivers are typically not concerned with interference cancellation that may require an increased number of bits and as such do not produce a second digital representation of the signal with greater bit accuracy.

SUMMARY OF THE INVENTION

The present invention provides systems and methods for operating signal cancellation with a receiver. In one embodiment of the invention, the receiver comprises a discretizer configured for generating a plurality of digital signals from a received analog signal. For example, the discretizer may generate two digital signals from the analog signal with each digital signal being sampled by an A/ID converter at a particular resolution. Accordingly, each of these two digital signals comprises a number of bits specific to the resolution used to generate the digital signal representations.

Typical rake receivers use a requisite number of bits to process a received signal. For example, once a radio signal is received by the receiver, it is digitized at a predetermined resolution. The resultant digital signal is transferred to processing fingers of the receiver for tracking and demodulation. Often, the tracking and demodulation processes of prior art receivers only requires enough information as to determine the polarity of a data symbol. The A/D conversion of the rake receiver is, therefore, performed at a resolution that can enable such a determination with consideration to the associated computational cost.

Since interference from other signals is an ever-present problem in communications and since prior art rake receivers do not effectively eliminate interference, one embodiment of the present invention includes a Coded Signal Processing Engine ("CSPE") that substantially cancels the interference. In this embodiment, the CSPE is communicatively coupled to the discretizer and configured for substantially canceling one or more interfering signals of a digital signal. The CSPE receives a digital signal with a bit width different from the bit width used by other processing functions of the rake receiver (e.g., processing fingers and/or searcher fingers).

The digital signal received by the CSPE is typically discretized at a higher resolution than that of the signal used by the other processing functions of the rake receiver. This higher resolution may allow for better characterization of signals that interfere with the recovery of the SOI. For example, signal cancellation as described hereinbelow may be performed using a composite interference vector ("CIV") as described in the '015 patent application. The CIV includes information regarding the amplitudes of certain interfering signals to more effectively cancel those signals.

In one embodiment of the invention, the CSPE includes a matrix generator that is configured for generating an interference matrix from one or more codes of interfering signals. In another embodiment of the invention, some of the interfering codes are generated by a processing finger of the rake receiver. For example, the rake receiver may comprise a plurality of processing fingers, each of which is configured for processing either the digital signal used by the typical rake receiver or the substantially interference canceled digital signal generated by the CSPE. When processing a digital signal used by the typical rake receiver, a processing finger may extract a PN code of a signal assigned to the processing finger and transfer the code to the CSPE to assist in interference matrix construction. An example of such interference matrix construction is also described in the '015 patent application.

With the interference matrix construction, the CSPE may generate a cancellation operator that is used to substantially cancel the one or more interfering signals from the digital signal. Accordingly, the CSPE of one embodiment of the invention includes a canceller that is configured for using an interference matrix and generating a cancellation operator. In another embodiment of the invention, the cancellation operator is a projection operator that projects the digital signal onto a subspace that is substantially orthogonal to a subspace of the interference. For example, the projection operator may be generated according to the form:

$$P_S^\perp = I - S(S^T S)^{-1} S^T, \quad \text{(Eq. 1)}$$

where $P_S^\perp$ is the projection operator, I is an identity matrix, S is the interference matrix and $S^T$ is a transpose of S.

Once the cancellation operator is generated, the CSPE may apply the cancellation operator to the digital signal. Application of the cancellation operator to the digital signal substantially cancels the interfering signals specified in the generation of the interference matrix. The resultant substantially interference canceled digital signal may have its bit representation adjusted such that it occupies the appropriate bit width for subsequent processing by a processing finger of the rake receiver. For example, the CSPE may comprise a gain controller, such as an AGC, that receives the substantially interference canceled digital signal and adjusts the energy of the signal to a bit width required by the rake receiver. In one embodiment of the invention, the interference matrix is constructed using a digital signal representation of a different resolution than that used in the processing of the rake receiver.

DETAILED DESCRIPTION OF THE DRAWINGS

Figure 1:
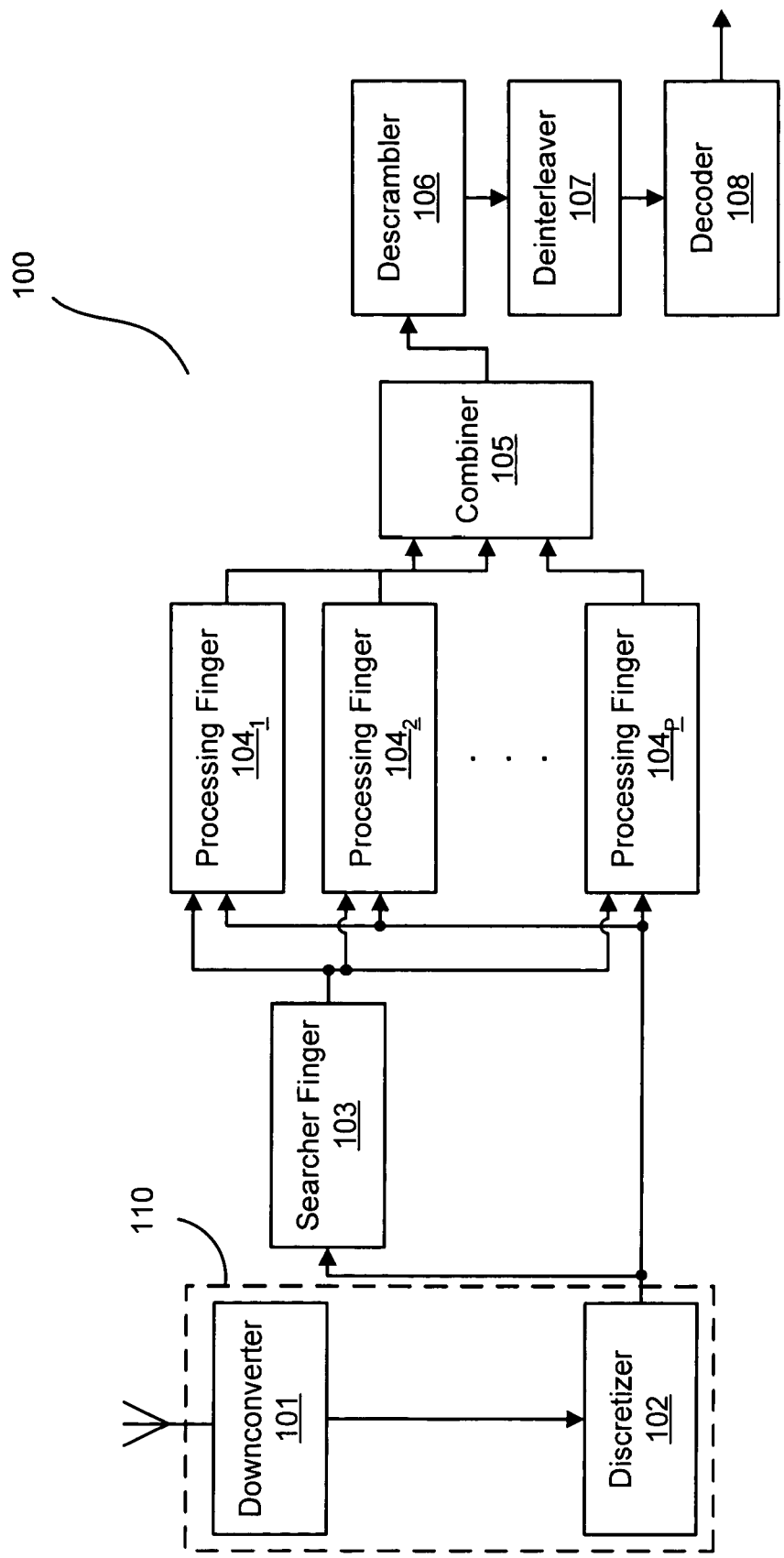
FIG. 1 is a block diagram of a prior art rake receiver.
Figure 2:
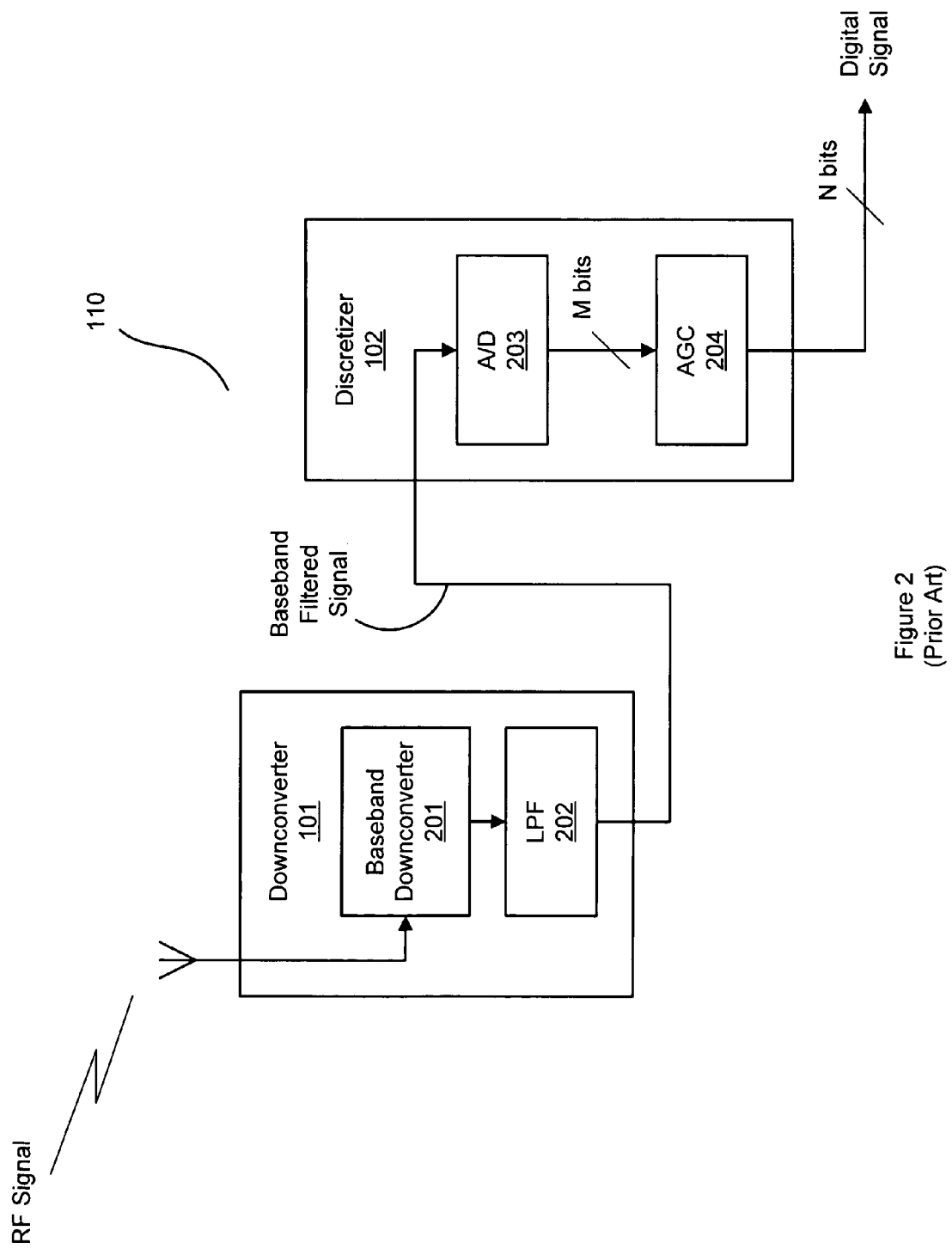
FIG. 2 is a block diagram of a prior art receiver front end.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

Figure 3:
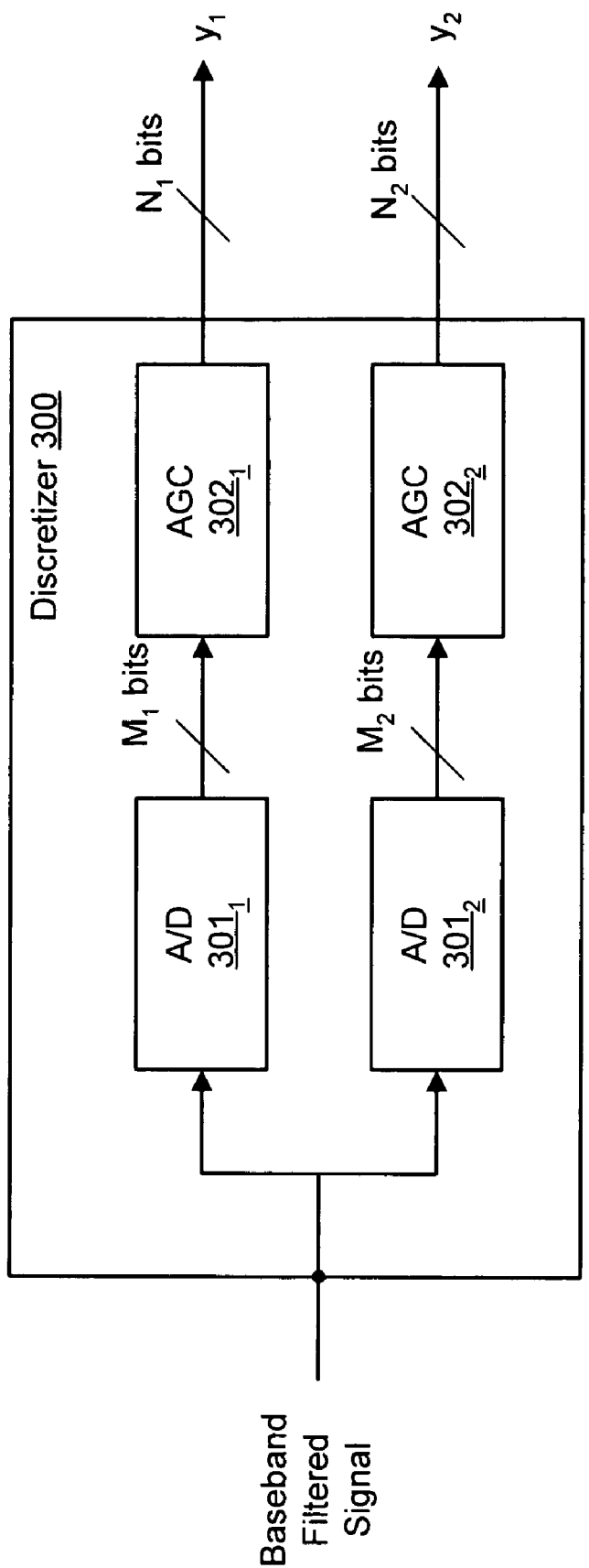
FIG. 3 is a block diagram of a discretizer as utilized in one embodiment of the invention.

FIG. 3 is a block diagram of discretizer 300 as used in one embodiment of the invention. In this embodiment, discretizer 300 comprises a pair of digital conversion chains, each comprising an A/D converter 301 (labeled A/D converter $301_1$, and $301_2$) and an AGC 302 (labeled AGC $302_1$ and $302_2$). The digital conversion chains comprising A/D converter $301_1$ receives the baseband filtered signal produced by a down converter, such as down converter 101 of FIG. 1, and converts the signal to a digital signal at a resolution that represents the baseband filtered signal with a first bit width $M_1$. The resultant digital signal is then transferred to AGC $302_1$ for requisite amplitude adjustment and scaling of a typical rake receiver. For example, AGC $302_1$ may receive a digital signal comprising a first number of bits that represents the baseband filtered signal. After adjusting amplitude of the digital representation, the number of bits representing the signal may be adjusted to a second bit width $N_1$ to appropriately configure the signal for the requisite dynamic range of the receiver. The scaled and adjusted digital signal may then be transferred as digital signal $y_1$ to the searcher finger and the processing fingers of the rake receiver, such as searcher finger 103 and processing fingers 104 respectively of FIG. 1.

Similarly, the baseband filtered signal is transferred to the digital conversion chain comprising A/D converter $301_2$ and AGC $302_2$. In this embodiment of the invention, the digital conversion chain converts the baseband filtered signal to a digital signal with a different bit width. For example, A/D converter $301_2$ may provide a different bit representation of the baseband filtered signal with a second bit width with higher resolution represented by a number of bits $M_2$. The second bit width digital signal is then transferred to AGC $302_2$ for amplitude adjustment and scaling to generate a digital signal $y_2$ similar to that of AGC $302_1$. The digital signal $y_2$ may then be transferred to a processing engine, such as a CSPE described hereinbelow, for interference cancellation upon a signal.

While one embodiment has been shown in described, those skilled in the art should readily recognize that the invention is not intended to be limited to the number of components within discretizer 300. For example, in a receiver employing receive diversity, each receiver chain of the receive diversity receiver may use one or more processing engines to substantially cancel interfering signals. Accordingly, each processing engine may be configured to receive a unique digital signal discretized to a unique bit width. Alternatively, each processing engine may be configured to receive either or both of the digital signals $y_1$ and $y_2$ as described herein. For at least these reasons, the invention should only be limited to the language recited in the claims and their equivalents.

Additionally, the embodiment shown and described herein may be implemented in a variety of ways. For example, discretizer 300 may be implemented in software, firmware, hardware or various combinations thereof. Those skilled in the art are familiar with software, firmware, hardware and their various combinations and understand that such implementations are typically a matter of design choice. To illustrate, those skilled in the art may choose to implement certain aspects of the invention in hardware using Application Specific Integrated Circuit ("ASIC") chips, Field Programmable Gate Arrays ("FPGA"), Digital Signal Processors ("DSP") and/or other integrated circuitry (e.g., custom designed circuitry). Still, some aspects of the invention may be implemented through combinations of software using Java, C, C++, Matlab, Verilog, VHDL, and/or processor specific machine and assembly languages.

Figure 4:
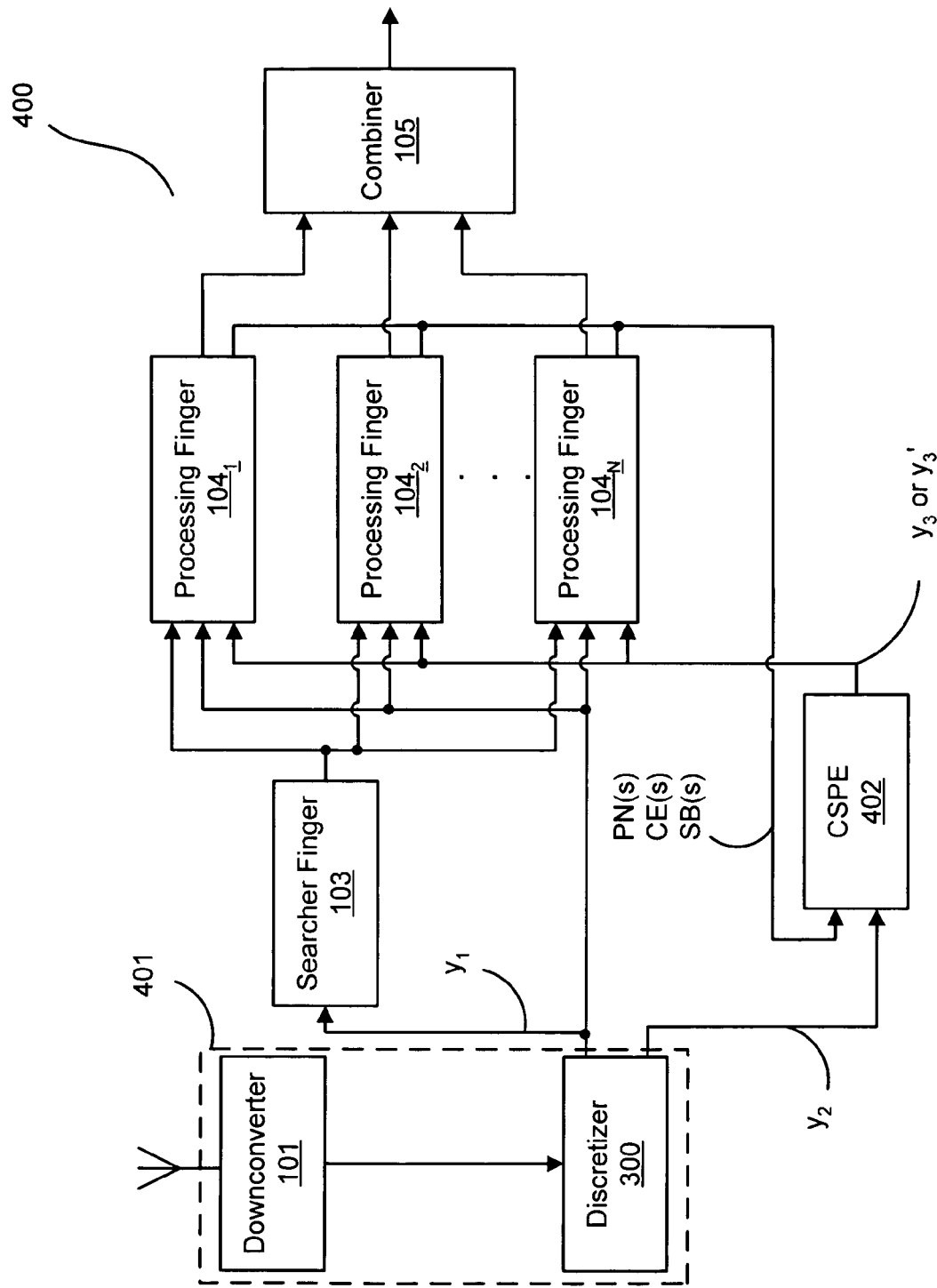
FIG. 4 is a rake receiver with a discretizer as utilized in one embodiment of the invention.

FIG. 4 is rake receiver 400 with discretizer 300 as used in one embodiment of the invention. In this embodiment, discretizer 300 of FIG. 3 is implemented within receiver front end 401. Receiver front-end 401 also comprises down converter 101 of FIG. 1. Accordingly, receiver front-end 401 receives an analog radio signal and converts the signal to baseband for subsequent digital conversion by discretizer 300 as described above in FIG. 3.

In this embodiment, the digital signal $y_1$ is transferred to searcher finger 103 and processing fingers $104_{1...N}$. Processing functionality of the digital signal $y_1$ by searcher finger 103 and processing fingers $104_{1...P}$ is substantially the same as that described in FIG. 1. For example, searcher finger 103 may detect signal paths and assign the signal paths to processing fingers 104 for processing of a SOI. Differing from FIG. 1, however, is the introduction of digital signal $y_2$ by discretizer 300.

Discretizer 300 generates the digital signal $y_2$ by converting the filtered baseband signal into a digital signal representation with a bit width that differs from the bit width used for signal $y_1$. In one embodiment of the invention, a higher bit resolution used for digital signal $y_2$ is than that used for digital signal $y_1$. The digital signal $y_2$ is transferred to CSPE 402 wherein signal cancellation is performed thereon.

In this embodiment of the invention, CSPE 402 receives the digital signal $y_2$, as well as PN codes, chip enable ("CE") signals and/or symbol boundary ("SB") signals. The PN codes, CE signals and the SB signals are generated by the processing fingers 104 and may be used to generate an interference matrix as described hereinabove. For example, SB signals specify a chip location of a symbol boundary in the signal $y_2$. CE signals specify a sample location of the symbol boundary and provide a reference for decimation of chip rate data. Additionally, phase estimates of the signals assigned to processing fingers 104 may also be transferred to CSPE 402 for interference matrix construction. Examples of such phase estimates are described in the '015 patent application.

Once the interference matrix is generated, CSPE 402 substantially cancels one or more interfering signals from the digital signal $y_2$. For example, the PN codes and/or phase estimates of interfering signals may be used to construct the interference matrix. The CE signals and the SB signals may be used as time reference information in the construction of the interference matrix. CSPE 402 may then generate a cancellation operator, which is applied to the digital signal $y_2$ to substantially cancel the one or more interfering signals from signal $y_2$ and generate a substantially interference cancelled signal $y_2'$. In one embodiment of the invention, the cancellation operator is a projection operator as described hereinabove.

Based on a signal indication from rake receiver 400, CSPE 402 may select either or both of the uncancelled digital signal $y_2$ or the substantially interference cancelled digital signal $y_2'$ for processing by one or more of processing fingers $104_{1...P}$. For example, once CSPE 402 has performed signal cancellation upon digital signal $y_2$ and has generated the substantially interference canceled digital signal $y_2'$, CSPE 402 may selectively transfer either or both of the digital signal $y_2$ and the substantially interference canceled digital signal $y_2'$ to the processing fingers 404 for tracking and demodulation via an AGC in CSPE 502. The AGC effectively reduces the bitwidth of the selected signal(s) (i.e., $y_2$ and/or $y_2'$) to a bitwidth commensurate with the rake receiver. In this embodiment, the AGC produces the signal $y_3$ from the signal $y_2$ and signal $y_3'$ from the signal $y_2'$, respectively, where signal $y_3$ is substantially equivalent to $y_1$. The demodulated signals from processing fingers 104 may then be combined by combiner 105 to generate an improved estimate of an SOI.

While one embodiment has been shown and described herein, those skilled in the art should readily recognize that invention is not intended to be limited to the illustrated embodiment. For example, CSPE 402 may be configured to generate a plurality of cancellation operators to substantially cancel a plurality of interfering signals. Such interference cancellation may be performed in either a serial, a parallel or a hybrid serial/parallel manner such as described in the '777, '346 and '669 patent applications. Accordingly, the invention should only be limited by the language recited in the claims and their equivalents.

Figure 5:
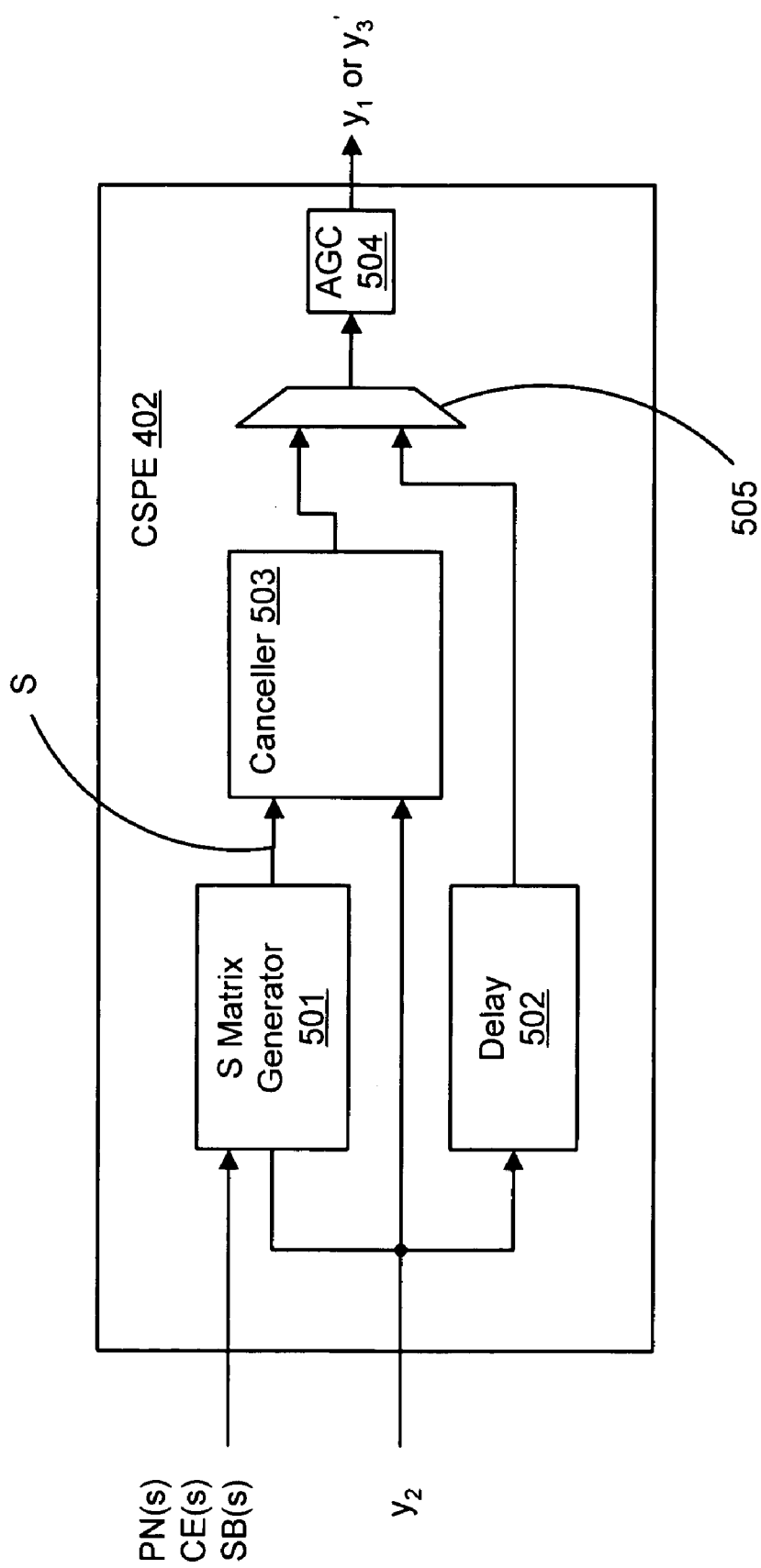
FIG. 5 is a block diagram of a CSPE in one embodiment of the invention.

FIG. 5 is a block diagram of CSPE 402 in one embodiment of the invention. In this preferred embodiment, CSPE 402 is configured for substantially canceling one or more interfering signals from digital signal $y_2$. CSPE 402 comprises S matrix generator 501 which is configured for generating an interference matrix "S" that is used to substantially cancel one or more interfering signals from the digital signal $y_2$. For example, matrix generator 501 constructs an interference matrix from components of the one or more interfering signals. The generated S matrix is used to generate a cancellation operator which is applied to the digital signal $y_2$ to substantially cancel the interfering signals used in the matrix construction. Accordingly, CSPE 402 also comprises canceller 503 which uses the generated S matrix to generate a cancellation operator for application to the digital signal $y_2$.

S matrix generator 501 is configured for generating the S matrix from a PN code(s) of the interfering signal(s) and the digital signal $y_2$. Matrix generator 501 may also be configured for constructing the interference matrix from a CE signal(s), an SB signal(s) and/or phase estimate(s) of the interfering signal(s) as described above in FIG. 4. Interference matrix construction is shown and described in greater detail in the '015 application, which is incorporated by reference.

The matrix generated by matrix generator 501 is transferred to canceller 503 for the generation of the cancellation operator. In one embodiment of the invention, the cancellation operator is a projection operator, which is used to project the digital signal $y_2$ onto a subspace that is substantially orthogonal to a subspace spanned by the interfering signal(s). For example, canceller 503 may generate the projection operator substantially according to the following equation:

$$P_S^\perp = I - S(S^T S)^{-1} S^T, \qquad (\text{Eq. 1})$$

where $P_S^\perp$ is the projection operator, I is an identity matrix, S is the interference matrix and $S^T$ is a transpose of S.

Canceller 503 applies the cancellation operator to the digital signal $y_2$, which substantially cancels or removes the interfering signal(s) specified in the S matrix from the digital signal $y_2$. The cancellation by canceller 503 results in a substantially interference canceled digital signal $y_2'$. The substantial cancellation of the interfering(s) may lead to an improved Signal to Noise Ratio ("SNR") of an SOI within the digital signal $y_2$ since the signal energy contributions of the interfering signals are substantially removed from the overall signal energy of the digital signal $y_2$.

Alternatively, canceller 503 may generate the substantially interference canceled digital signal $y_2'$ directly according to the following equation:

$$P_S^\perp y = y - S(S^T S)^{-1} S^T y, \qquad (\text{Eq.2})$$

where $P_S^\perp$ is the projection operator, S is the interference matrix, $S^T$ is a transpose of S and y is the digital signal.

Upon generating the substantially interference canceled digital signal $y_2'$, CSPE 402 may select either the input digital signal $y_2$ or the substantially interference canceled digital signal $y_2'$ for transfer to AGC 504. For example, a decision may be made that digital signal $y_2$ is sufficient for processing or alternatively that the substantially interference canceled digital signal $y_2'$ would be preferable. Such a decision may be performed either by CSPE 402 or by other components within the receiver and external to CSPE 402. Once the determination is made, a control signal may be transferred to selector 505 to transfer either the selected signal to the processing finger(s) 104 of receiver 400 via AGC 504. As the digital signal $y_2$ may be selected for processing, CSPE 402 also comprises a delay element 502 which may compensate for delays introduced by the signal cancellation processing of S matrix generator 501 and canceller 503. In this preferred embodiment, CSPE 402 comprises AGC 504 communicatively coupled to selector 505 and configured for adjusting the amplitude of a digital signal $y_2$ or a substantially interference canceled digital signal $y_2'$ to a requisite amplitude and/or bit width for a receiver. For example, rake receiver 400 FIG. 4 may require a particular bit width for processing. Accordingly, AGC 504 may adjust the amplitude and bit width of the substantially interference canceled digital signal $y_2'$ to a level commensurate with the bit widths and dynamic range of the rake receiver. This adjustment by AGC 504 to either the digital signal $y_2$ or the substantially interference canceled signal $y_2'$ produces the signals $y_3$ and $y_3'$, respectively where the signal $y_3$ is substantially equivalent to the signal $y_1$. The resulting signals $y_3$ and/or $y_3'$ produced by AGC 504 are transferred to the processing fingers 104 and/or searcher finger 103 of FIG. 4.

Although one preferred embodiment of a CSPE has been shown and described, the invention is not intended to be limited to the preferred embodiment. Other embodiments may use other inputs for S matrix construction. An example of such an embodiment is shown and described below in FIG. 7. Accordingly, the invention should not be limited to the preferred embodiment shown and described herein. Rather, the invention should only be limited by the claims and their equivalents. Additionally, those skilled in the art should readily recognize that the invention may be implemented in a variety of manners such as those employing software, hardware, firmware or various combinations thereof as described above herein.

Figure 6:
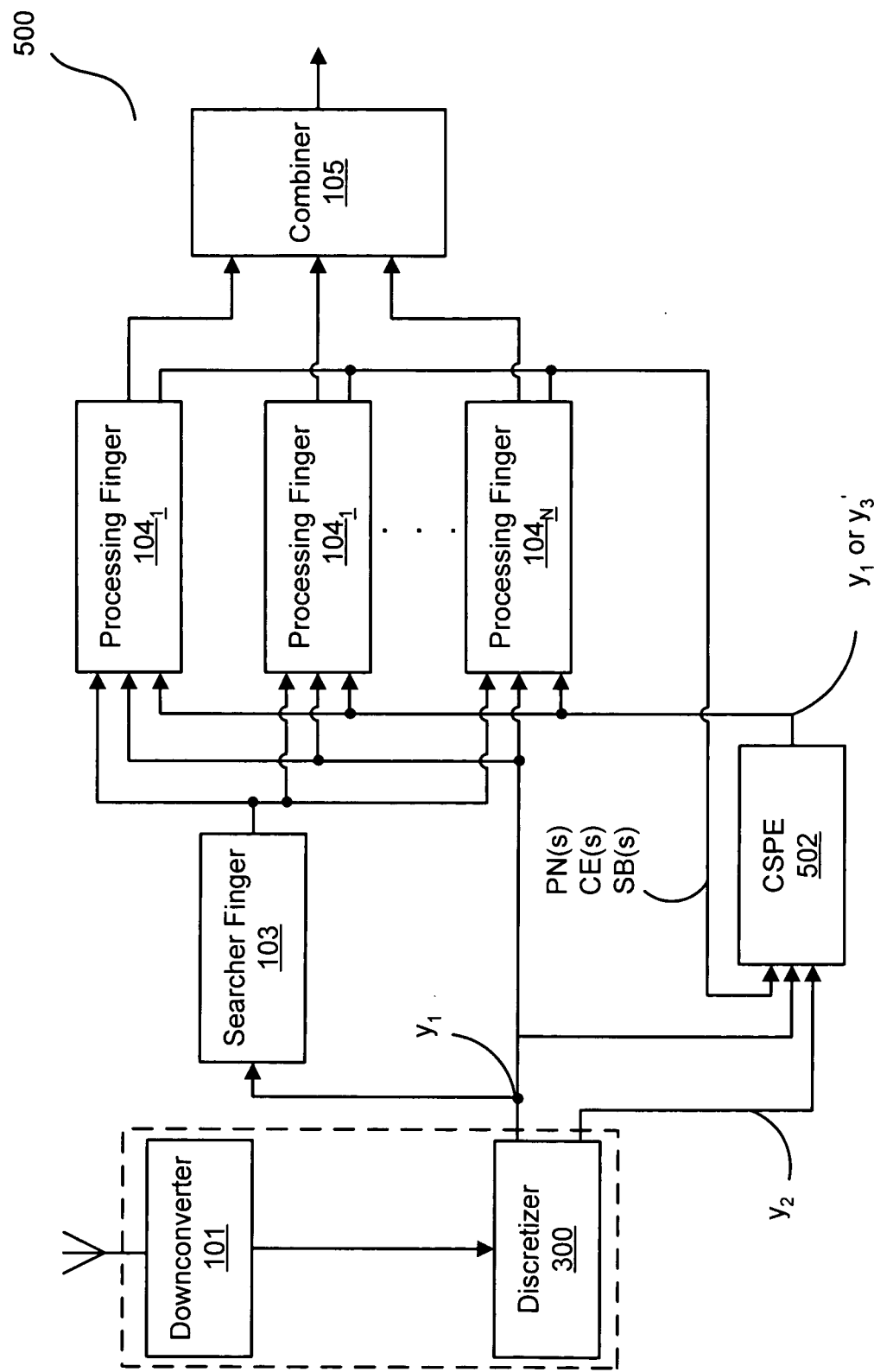
FIG. 6 is a rake receiver with a discretizer in another embodiment of the invention.

FIG. 6 is rake receiver 500 with discretizer 300 in another embodiment of the invention. In this alternative embodiment, rake receiver 500 is configured substantially the same as rake receiver 400 of FIG. 4. Differing from FIG. 4, however, is CSPE 502, which is configured for receiving—in addition to the digital signal $y_2$—the digital signal $y_1$. CSPE 502 is still configured for generating an interference matrix S and using the interference matrix to substantially cancel one or more interfering signals from the digital signal $y_2$. But, CSPE 502 generates the interference matrix S using the digital signal $y_1$.

CSPE 502 receives the digital signal $y_1$ as well as a PN code(s) of one or more interfering signals to generate the interference matrix. Additionally, CSPE 502 may use CE signal(s) and/or SB signal(s) to assist in the generation of an interference matrix as described hereinabove. In a first embodiment, CSPE 502 uses the digital signal $y_1$ to generate an S matrix but perform the signal cancellation on the larger bit width digital signal $y_2$. In a second embodiment, CSPE 502 uses the digital signal $y_2$ for both S matrix generation and the signal to which signal cancellation is performed upon. Accordingly, interference matrix construction and signal cancellation do not change significantly with respect to the matrix construction and signal cancellation performed by CSPE 402 of FIG. 5. Examples of CSPE 502 is illustrated and described in greater detail below in FIGS. 7 and 11.

Once CSPE 502 has performed signal cancellation upon digital signal $y_2$, a substantially interference canceled digital signal $y_2'$ is generated. An AGC converts the interference canceled digital signal $y_2'$ into an appropriate bit width interference canceled digital signal $y_3'$ for rake receiver 500. CSPE 502 may then selectively transfer either or both of the digital signal $y_1'$ or the substantially interference canceled digital signal $y_3'$ to the processing fingers 104 for tracking and demodulation. The demodulated signals from processing fingers 104 may then be combined by combiner 105 to generate an improved estimate of an SOI.

Figure 7:
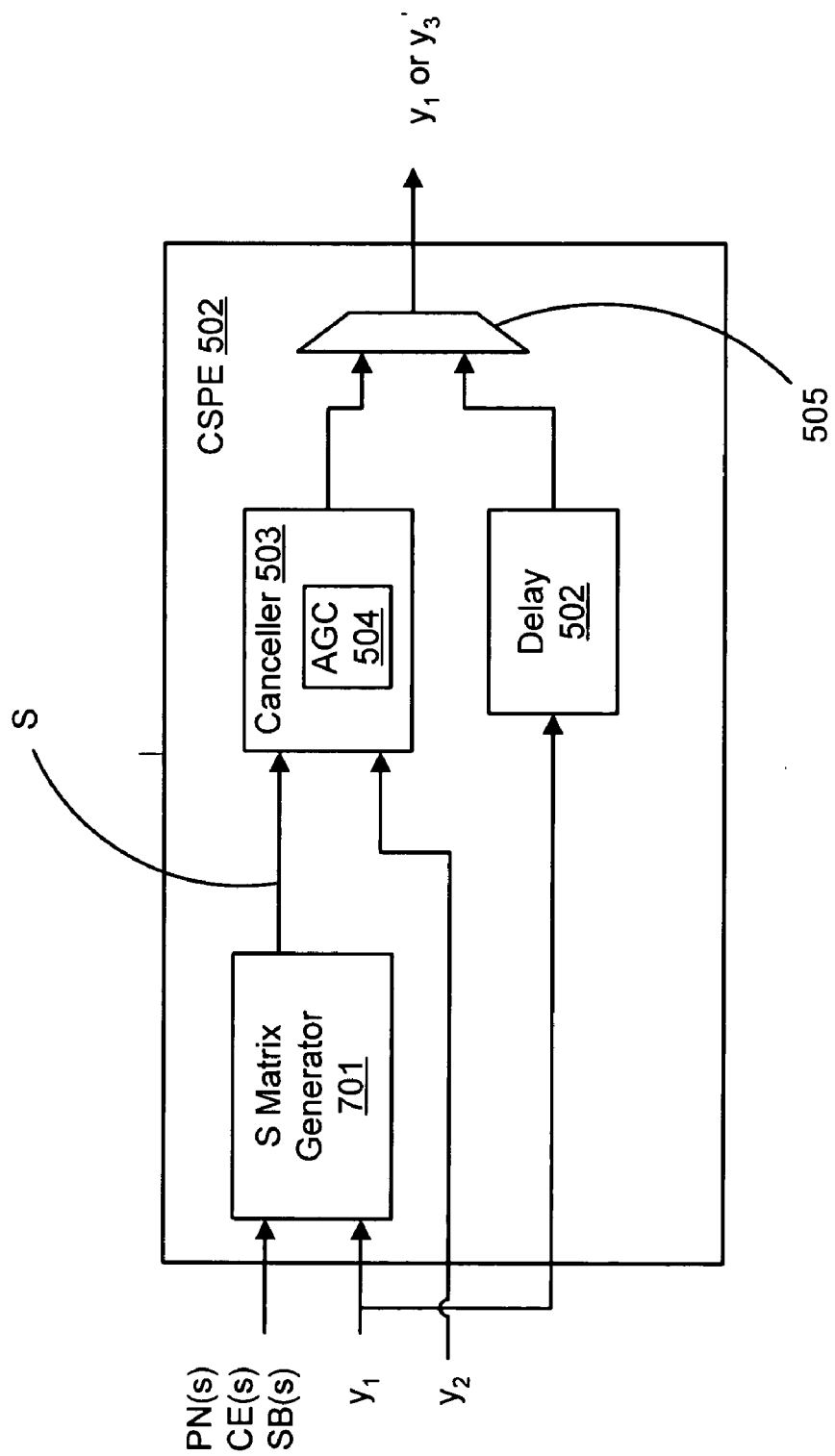
FIG. 7 is a block diagram of a CSPE in another embodiment of the invention.

FIG. 7 is a block diagram of CSPE 502 in another embodiment of the invention. In this alternative embodiment, CSPE 502 comprises S matrix generator 701 which is configured for generating an interference matrix S from digital signal $y_1$ as described in an embodiment of FIG. 6. For example, discretizer 300 of FIG. 3 generates two digital signals $y_1$ and $y_2$ at different resolutions; thereby each signal has a different bit width. CSPE 502 may receive each of the signals for signal cancellation purposes, wherein matrix generator 701 uses the digital signal $y_1$ as an input to the generation of the interference matrix S. Matrix construction performed by matrix generator 701 is, however, substantially the same as that described in the '015 patent application.

As with the matrix construction performed in FIG. 5, matrix generator 701 receives a PN code(s) of one or more interfering signals for the generation of the interference matrix. Also, matrix generator 701 may receive CE signal(s), SB signal(s) and/or phase estimate(s) of the interfering signals as previously described herein. Once the interference matrix S is constructed, matrix generator 701 transfers the matrix to canceller 603. Canceller 603 performs signal cancellation upon the digital signal $y_2$ by applying the cancellation operator to the signal. The signal cancellation results in a substantially interference canceled digital signal $y_2'$. AGC subsequently reduces the resolution of the interference canceled digital signal $y_2'$ to produce the smaller bit width interference canceled digital signal $y_3'$. As with CSPE 402 of FIG. 5, CSPE 502 selectively transfers either the digital signal $y_1$ or the substantially interference canceled digital signal $y_3'$ to processing fingers, such as processing fingers 104 of FIG. 6, via selector 505. To account for delays introduced by signal cancellation, delay module 602 delays the digital signal $y_1$ before transfer to the processing fingers, as was similarly performed in FIG. 5. Moreover, an additional AGC is not required after selector 505 as was required in CSPE 402 of FIG. 5.

Figure 11:
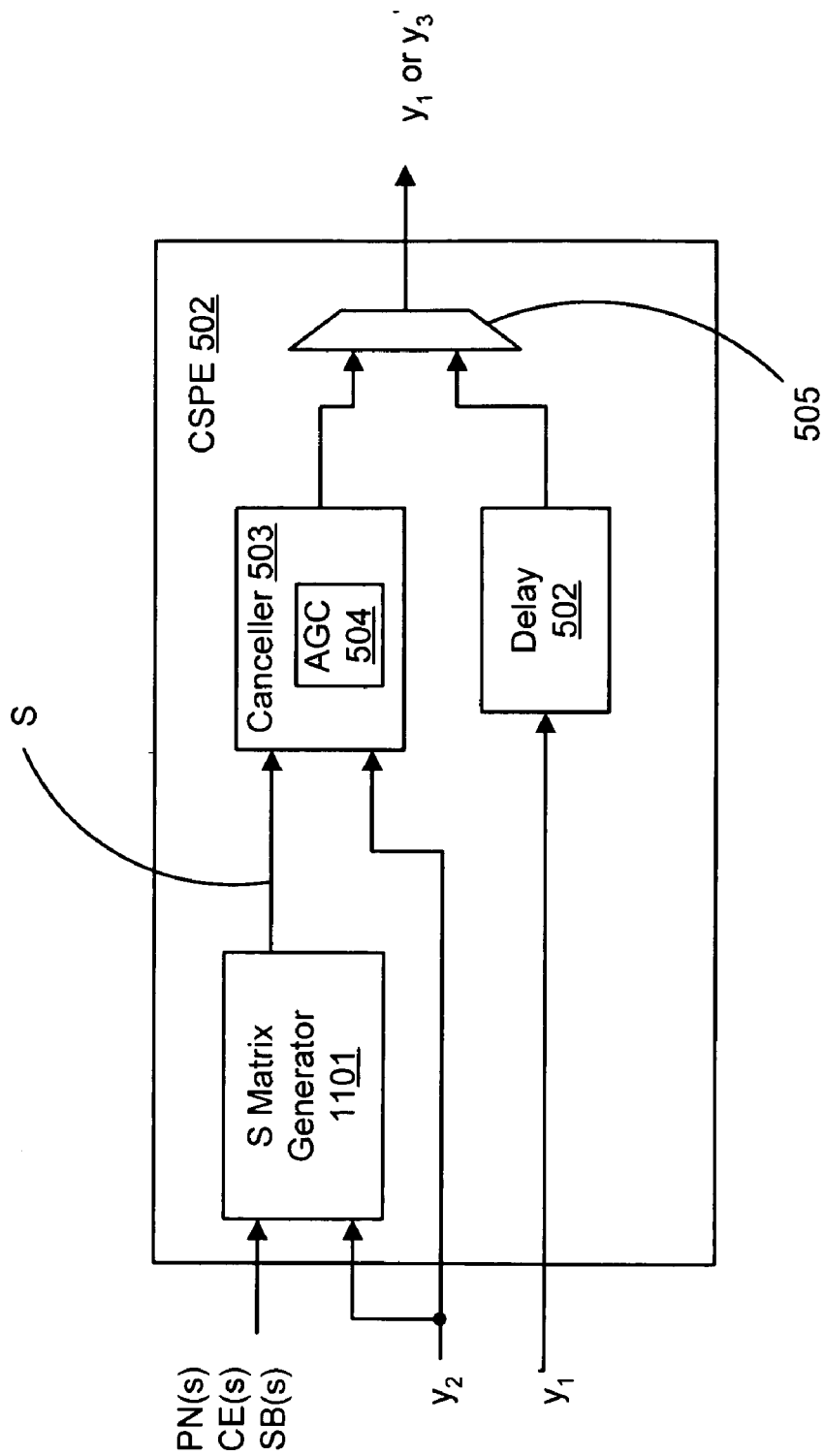
FIG. 11 is a block diagram of a CSPE in another embodiment of the invention.

FIG. 11 is a block diagram of CSPE 502 in another embodiment of the invention. In this alternative embodiment, CSPE 502 comprises S matrix generator 1101 which is configured for generating an interference matrix S from digital signal $y_1$ as described in an embodiment of FIG. 6. For example, discretizer 300 of FIG. 3 generates two digital signals $y_1$ and $y_2$ at different resolutions; thereby each signal has a different bit width. CSPE 502 may receive each of the signals for signal cancellation purposes, wherein matrix generator 1101 uses the digital signal $y_2$ as an input to the generation of the interference matrix S. Matrix construction performed by matrix generator 1101 is, however, substantially the same as that described in the '015 patent application.

As with the matrix construction performed in FIG. 5, matrix generator 701 receives a PN code(s) of one or more interfering signals for the generation of the interference matrix. Also, matrix generator 1101 may receive CE signal(s), SB signal(s) and/or phase estimate(s) of the interfering signals as previously described herein. Once the interference matrix S is constructed, matrix generator 1101 transfers the matrix to canceller 603. Canceller 603 performs signal cancellation upon the digital signal $y_2$ by applying the cancellation operator to the signal. The signal cancellation results in a substantially interference canceled digital signal $y_2'$. AGC subsequently reduces the resolution of the interference canceled digital signal $y_2'$ to produce the smaller bit width interference canceled digital signal $y_3'$. As with CSPE 402 of FIG. 5, CSPE 502 selectively transfers either the digital signal $y_1$ or the substantially interference canceled digital signal $y_3'$ to processing fingers, such as processing fingers 104 of FIG. 6, via selector 505. To account for delays introduced by signal cancellation, delay module 602 delays the digital signal $y_1$ before transfer to the processing fingers, as was similarly performed in FIG. 5. Moreover, an additional AGC is not required after selector 505 as was required in CSPE 402 of FIG. 5. While one alternative embodiment of a CSPE has been shown and described, the invention is not intended to be limited to this alternative embodiment. Rather, the invention should only be limited by the claims and their equivalents. Additionally, those skilled in the art should readily recognize that the invention may be implemented in a variety of manners such as those employing software, hardware, firmware or various combinations thereof as described above herein.

Figure 8:
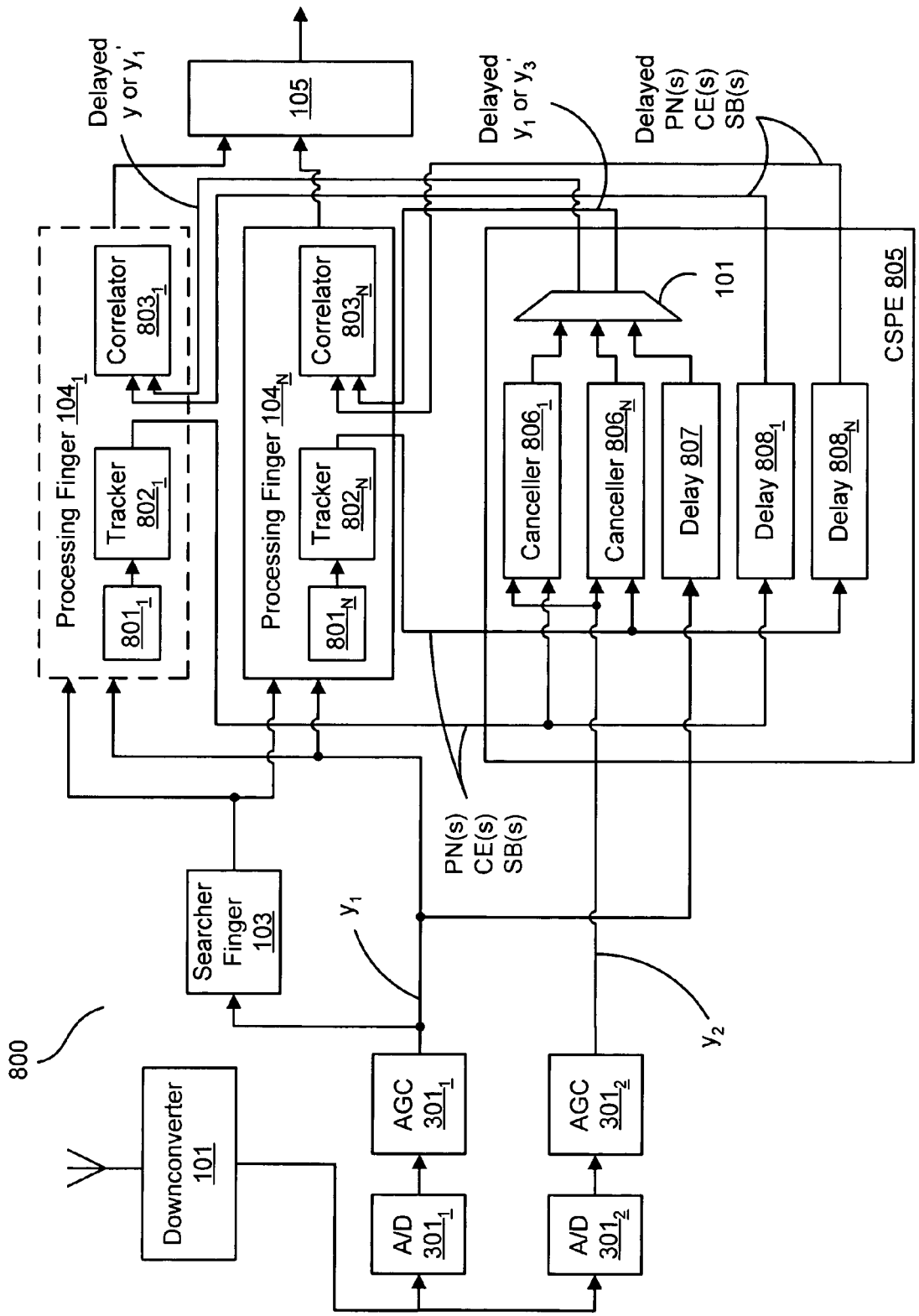
FIG. 8 is a block diagram of rake receiver in another embodiment of the invention.

FIG. 8 is a block diagram of rake receiver 800 in another embodiment of the invention. In this embodiment, rake receiver illustrates dual digital conversion chains (i.e., a first digital conversion chain comprising A/D 301₁ and AGC 301₁ and a second digital conversion chain comprising A/D 301₂ and AGC 301₂). These digital conversion chains operate in the same manner as discretizer 300 of FIG. 3 to generate a first digital signal $y_1$ at a bit width $N_1$ and a second digital signal $y_2$ at a second bit width $N_2$.

Rake receiver 800 comprises a plurality of processing fingers 104₁...ₙ, each comprising a PN code generator 801, a tracker 802 and a correlator 803. The digital signal $y_1$ is transferred from AGC 301₁ to searcher finger 103 and/or to processing fingers 104₁...ₙ as performed by a typical rake receiver.

PN code generators 801₁...ₙ generate PN codes of interfering signals, which are used by trackers 802₁...ₙ to track signal paths assigned to the associated signal processing fingers 104₁...ₙ. In this embodiment, trackers 802₁...ₙ transfer the tracked signal path information to cancellers 806₁...ₙ for interference cancellation within CSPE 805 and to delay elements 808₁...ₙ. For simplicity, interference matrix construction is not illustrated in this embodiment. However, interference matrix construction for the purposes of this embodiment can be assumed as being performed by cancellers 806₁...ₙ.

In cancellers 806₁...ₙ, S matrix generation and the interference cancellation operation may be performed with any combination of digital signals $y_1$ and $y_2$. For example, digital signal $y_2$ may be used for the generation of the S matrix while the interference cancellation operation may be performed on digital signal $y_1$. Similarly, the digital signal $y_2$ may be used for both S matrix generation and as the signal to which the interference cancellation operator is applied. Additionally, trackers 802₁...ₙ may transfer the on-time PN codes to CSPE 805 for interference matrix construction. Trackers 802₁...ₙ may also transfer CE signals and SB signals to CSPE 805 for S matrix construction. Cancellers 806₁...ₙ perform interference cancellation either the digital signal $y_1$ or $y_2$, wherein each signal cancellation substantially removes one or more interfering signals from the digital signal as determined by the interference matrix generated within a particular canceller 806. Additionally, cancellers 806₁...ₙ have AGC modules that adjust the bitwidth to $N_2$ as AGC 302₁ does in FIG. 3 producing the set of signals $\{y_3'\}$.

In this embodiment, CSPE 805 selectively transfers a delayed digital signal $y_1$ (i.e., as delayed by a delayed element 807) and/or one or more substantially interference canceled digital signals $y_3'$ to correlators 803₁...ₙ for subsequent demodulation. In an alternative embodiment the delayed digital signal is $y_2$ that is passed through an AGC similar to AGC 302₁ as in FIG. 3 to produce an $N_2$ bit delayed digital signal. Each signal $y_3'$ typically comprises an SOI with a plurality of interfering signals substantially canceled. Delay element 807 delays the uncanceled digital signal $y_1$ to accommodate for delays introduced by the signal cancellation processes of cancellers 806₁...ₙ.

Similarly, delay elements 80₇ operate to delay signals transferred to CSPE 805 to accommodate for delays introduced by cancellers 806₁...ₙ. These delayed signals are also transferred to correlators 803₁...ₙ for demodulation. In one embodiment, the correlators 803₁...ₙ selectively demodulate either an uncanceled signal (i.e., the delayed signal) or the signals selected by selector 101 (i.e., the substantially interference canceled signals of $y_2'$ and/or the uncanceled signal $y_2$). Moreover, the delay elements 808₁...ₙ may delay the PN code(s), CE signal(s), and/or SB signal(s) in CSPE 805.

CSPE 805 may selectively transfer one or more of the substantially interference canceled digital signals $\{y_3'\}$ generated by cancellers 806₁...ₙ and/or the digital signal $y_1$ as delayed by delay element 807 to rake receiver 800.

The signals that are transferred to correlators 803₁...ₙ may have their amplitudes adjusted to amplitudes substantially equivalent to the amplitude scaling of the RF front-end of the rake receiver 401. Additionally, the signals may be adjusted to an appropriate bit width (i.e., dynamic range) by a gain controller of the rake receiver 800. For example, a gain controller, such as an AGC, may be configured to the output of selector 101 or configured within cancellers 806₁...ₙ to adjust the amplitude and/or scaling of the signals transferred to correlators 803₁...ₙ. Examples of such gain controllers are illustrated and described in elements 504 of FIGS. 5 and 7.

Once demodulated, the demodulated signals are transferred from correlators 803₁...ₙ to combiner 105 to generate an improved estimate of an SOI. The combiner 105 may combine the signals using any well-known combining method. For example, combiner 105 may combine the signals using an MRC combining.

Rake receivers and their associated processing fingers, combiners, and various other components are well-known to those skilled in the art. The components of processing fingers, such as PN code generators 801, trackers 802 and correlators 803, are also well-known to though skilled in the art.

While one embodiment has been shown and described herein, the invention is not intended to be limited to the illustrated embodiment. Rather, the invention should only be limited to language recited in the claims and their equivalents. Additionally, those skilled in the art should readily recognize that the embodiment may be implemented in a variety of manners that include software, firmware, hardware or various combinations thereof as described hereinabove.

Figure 9:
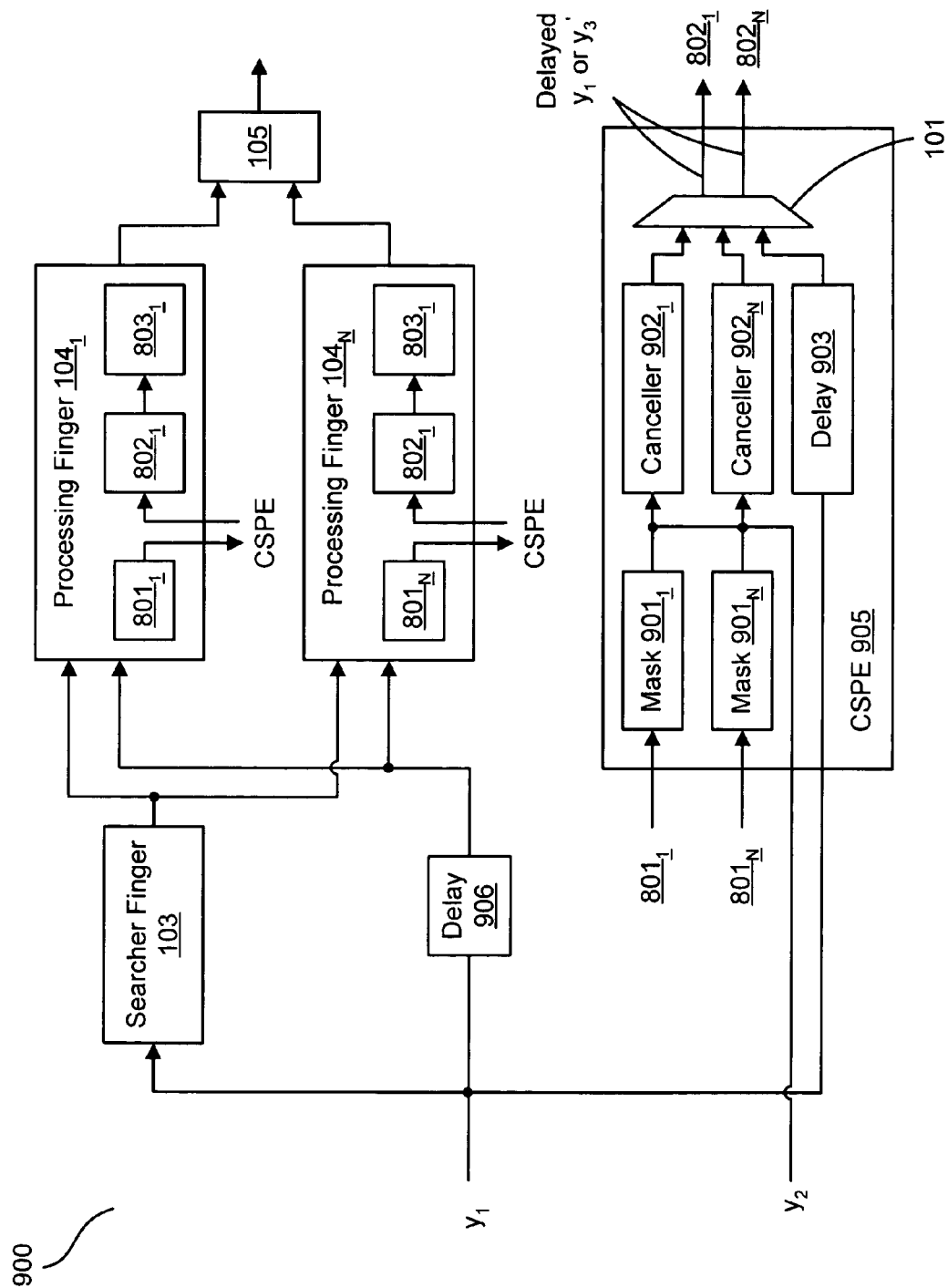
FIG. 9 is a block diagram of rake receiver in another embodiment of the invention.

FIG. 9 is a block diagram of rake receiver 900 another embodiment of the invention. In this preferred embodiment, the digital signals $y_1$ and $y_2$ generated by a discretizer having two digital conversion chains (e.g., as in discretizer 300 of FIG. 3) are transferred to the processing portion of rake receiver 900 and signal cancellation portion of the receiver. For example, searcher finger 103 receives the digital signal $y_1$ to detect a signal path therefrom. Additionally, the signal $y_1$ is transferred to processing fingers $104_{1...N}$ for PN code generation by PN code generators $801_{1...N}$. Delay 906 is introduced to the digital signal $y_1$ to compensate for delays introduced by CSPE 905.

PN code generators $801_{1...N}$ transfer PN codes of interfering signals to CSPE 905 for S matrix construction as described hereinabove. For example, the PN codes may be used to generate interference matrices as described in the '015 patent application. The PN codes are masked forward to advance the PN sequences ahead by an amount substantially equivalent to the delay of cancellers $902_{1...N}$. This masking when applied to the PN generating sequence advances the PN sequence and may be used to compensate for delays introduced by cancellers $902_{1...N}$. Again, interference matrix construction is not illustrated in this embodiment for simplicity but is assumed as being performed by cancellers $902_{1...N}$ on the signal $y_2$ for the purposes of this embodiment.

Once the interference matrices are generated, cancellers $902_{1...N}$ generate cancellation operators as described hereinabove and apply those operators to the digital signal $y_2$. Cancellers $902_{1...N}$ thereby generate a plurality of substantially interference canceled digital signals (i.e., a plurality of signals $\{y_3'\}$) wherein each signal generated by canceller typically has a unique combination of interfering signals substantially removed from the digital signal $y_2$. An AGC module, such as 504 in FIG. 5, adjusts the amplitude and bit width of each of the interference canceled digital signals $y_2'$ producing the set of interference canceled digital signals $\{y_3'\}$.

CSPE 905 may selectively transfer one or more of the substantially interference canceled digital signals $y_3'$ generated by cancellers $902_{1...N}$ and/or the digital signal $y_1$ delayed by element 906. For example, rake receiver 900 may determine that signal quality of the delayed uncanceled signals being processed by processing fingers 104 is sufficient for the recovery of transmitted data. Rake receiver 900 may therefore select the delayed digital signal $y_1$ or processing as opposed to one of set of the substantially interference canceled digital signals $\{y_3'\}$.

The signals that are transferred to correlators $803_{1...N}$ may have their amplitudes adjusted to requisite amplitudes of the rake receiver to exploit the full dynamic range of the available bits. Additionally, the bit width of the signals may be scaled to a requisite number of representative bits $N_1$ for the rake receiver 800. For example, a gain controller, such as an AGC, may be configured within cancellers $902_{1...N}$. Alternatively, an AGC may be configured to the output of selector 101 to adjust the amplitude and/or scaling of the signals transferred to correlators $803_{1...N}$. Examples of such gain controllers are illustrated and described in elements 504 of FIGS. 5 and 7.

While the preferred embodiment has been shown and described herein, the invention is not intended to be limited to the preferred illustrated embodiment. Rather, the invention should only be limited to language recited in the claims and their equivalents. Additionally, those skilled in the art should readily recognize that the embodiment may be implemented in a variety of manners that include software, firmware, hardware or various combinations thereof as described hereinabove.

Figure 10:
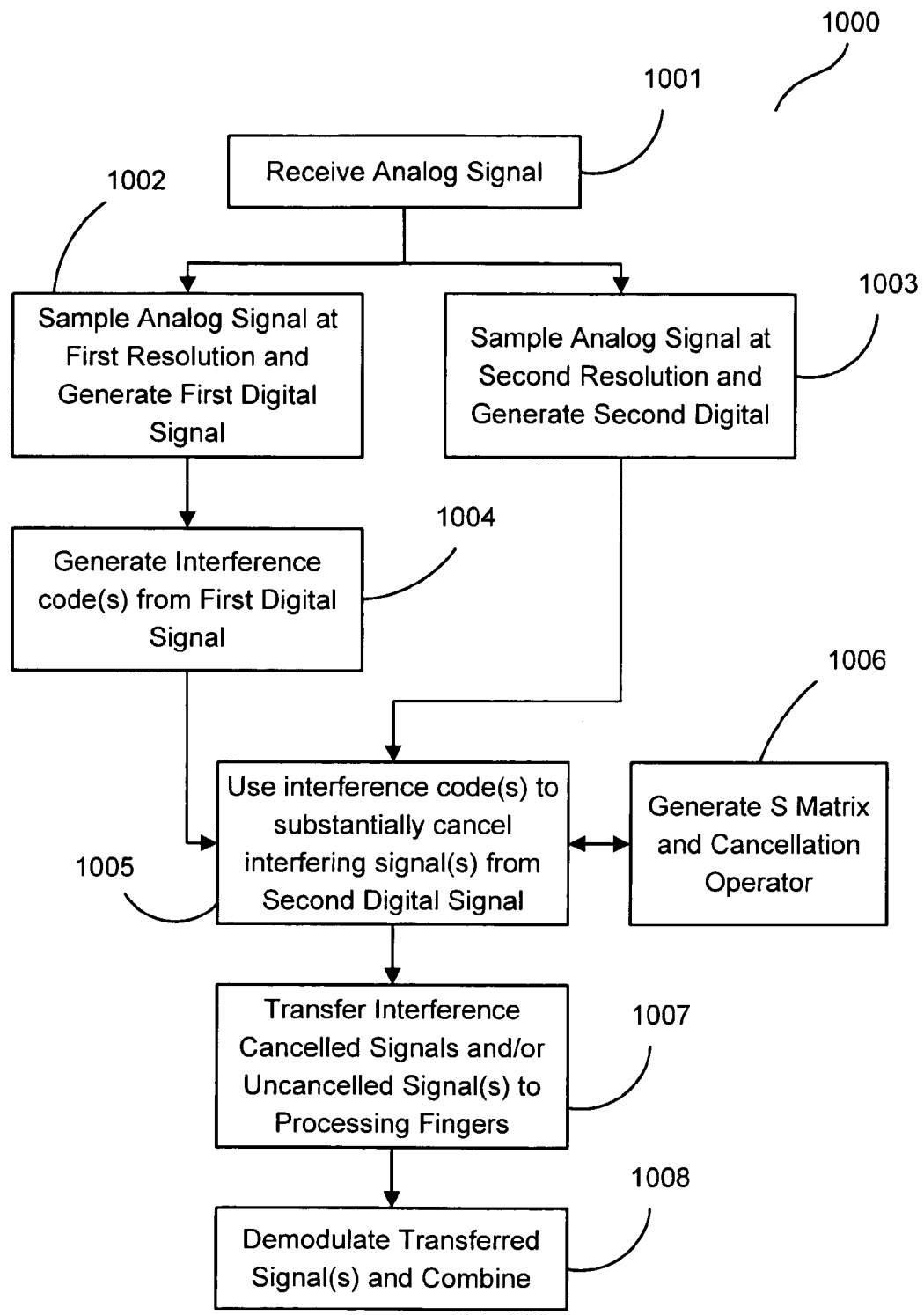
FIG. 10 is a flowchart of one methodical embodiment of the invention.

FIG. 10 is flowchart 1000 of one methodical embodiment of the invention. In this embodiment, an analog signal is received in element 1001. The analog signal may be down converted to baseband and filtered as described hereinabove. The signal is then sampled, or digitized, at first and second resolution to respectively generate first and second digital signals in elements 1002 and 1003. For example, the first signal may have a bit width commensurate with the number of bits used with a typical rake receiver. The second signal may have a second bit width in the cancellation of interfering signals. In one embodiment of the invention the second bit width provides greater resolution than the first bit width.

The first digital signal may be used to generate interference codes of one or more interfering signals comprised therein, in element 1004. For example, the digital signals may comprise a plurality of signals such as an SOI and one or more interfering signals. The first digital signal may be transferred to processing fingers of a rake receiver, which may be used to generate PN codes of the interfering signals. These interference codes may be used to substantially cancel the interfering signals from the second digital signal in element 1005.

In one embodiment of the invention, the interference codes are used to generate one or more interference matrices, which are further used to respectively generate one or more cancellation operators, in element 1006. The cancellation operators may be projection operators that project the second digital signal onto a subspace that is substantially orthogonal to the subspace of one or more interfering signals. Such a projection operator is described in Eq. 1 hereinabove. The cancellation operators may be applied to the second digital signal to substantially cancel interfering signals and improve SNR(s) of the SOI(s).

Once the interfering signals are substantially cancelled from the second digital signal, the resultant substantially interference canceled digital signals are transferred to processing fingers of a receiver, in element 1007. The signals may be subsequently demodulated by the processing fingers, in element 1008. Additional processing may be performed by the rake receiver and may include MRC combining, descrambling, deinterleaving and/or decoding of the signals as described hereinabove.

While one preferred methodical embodiment has been shown and described, the invention is not intended to be limited to the preferred embodiment. Rather the invention should only be limited to the language recited in the claims and their equivalents. Additionally, those skilled in the art should readily recognize that the methodical embodiment may be implemented in a variety of manners that include software, firmware, hardware or various combinations thereof.

The embodiments described herein may substantially reduce interference caused by unwanted signals and improve signal processing. For example, poor signal quality due to interference may deleteriously affect acquisition, tracking and demodulation of selected signals. A reduction in interference may, therefore, result in improved signal recovery of the selected signals. In regards to such benefits, the embodiments herein may advantageously require use within a CDMA telephony system. Improved processing within a CDMA telephony system may be exploited in terms of increased system capacity, transmit power reduction, increased system coverage and/or increased data rates. However, those skilled in the art should readily recognize that the above embodiments should not be limited to any particular method of signaling. For example, the embodiments disclosed herein may also be advantageous to systems employing CDMA (e.g., such as cdmaOne and cdma2000), WCDMA, Broadband CDMA, UMTS and GPS signals.

Additionally, it should be noted that the above embodiments of the invention may be implemented in a variety of ways. For example, the above embodiments may be implemented in software, firmware, hardware or various combinations thereof. Those skilled in the art are familiar with software, firmware, hardware and their various combinations. To illustrate, those skilled in the art may choose to implement certain aspects of the invention in hardware using ASIC chips, FPGAs, DSPs and/or other integrated circuitry (e.g., custom designed circuitry). Still, some aspects of the invention may be implemented through combinations of software using C, C++, Matlab, Verilog, VHDL and/or processor specific machine and assembly languages. Accordingly, those skilled in the art should readily recognize that such implementations are a matter of design choice and that the invention should not be limited to any particular implementation.

While the invention has been illustrated and described in detail in the drawings and foregoing description, such illustration and description is to be considered as exemplary and not restrictive in character. Accordingly, it should be understood that only the preferred embodiment and minor variants thereof have been shown and described and that all changes and modifications that come within the spirit of the invention are desired to be protected.

What is claimed is:

1. A system, comprising:
    a receiver front end configured for receiving an analog signal and comprising a plurality of discretizers, wherein each of said plurality of discretizers is configured for converting the analog signal to a digital signal, wherein a first discretizer of said plurality of discretizers is configured to sample the analog signal at a first resolution to generate a first digital signal for processing by a receiver at a first bit width, wherein a second discretizer of the said plurality of discretizers is configured to sample the analog signal at a second resolution to generate a second digital signal at a second bit width, and wherein the first bit width is different from the second bit width; and
    a processing engine communicatively coupled to the second discretizer and configured for substantially canceling one or more interfering signals of the second digital signal, wherein the processing engine comprises a matrix generator configured for generating an interference matrix from at least one code of the one or more interfering signals.

2. The system of claim 1, wherein the second bit width is greater than the first bit width.

3. The system of claim 1, wherein each of said plurality of discretizers comprises an analog to digital converter configured for converting the analog signal.

4. The system of claim 1, wherein each of said plurality of discretizers comprises a gain controller configured for adjusting gain.

5. The system of claim 1, wherein the receiver front end is configurable with a receiver selected from a group consisting of a handset receiver and a base station receiver.

6. The system of claim 1, wherein the processing engine comprises a canceller configured for generating a cancellation operator from the interference matrix and for applying the cancellation operator to the second digital signal to generate a substantially interference cancelled second digital signal.

7. The system of claim 6, wherein the cancellation operator comprises a projection operator configured for projecting the second digital signal onto a subspace substantially orthogonal to a subspace of the one or more interfering signals.

8. The system of claim 7, wherein the projection operator substantially comprises the form:

$$P_S^\perp = I - S(S^T S)^{-1} S^T,$$

where $P_S^\perp$ is the projection operator, I is an identity matrix, S is the interference matrix and $S^T$ is a transpose of S.

9. A mobile handset, comprising:
    a receiver front end configured for receiving a radio signal, converting the radio signal to a baseband signal and filtering the baseband signal;
    a discretizer communicatively coupled to the receiver front end and configured for generating first and second digital signal streams from a filtered said baseband signal, wherein the first digital signal stream has a first number of bits and the second digital signal stream has a second number of bits;
    a processing engine communicatively coupled to the discretizer and configured for substantially canceling one or more interfering signals of the first digital signal stream and for scaling a substantially cancelled said first digital signal stream to comprise the second number of bits, wherein the processing engine comprises a matrix generator configured for generating an interference matrix from at least one code of the one or more interfering signals; and
    one or more processing fingers, wherein a processing finger of said one or more processing fingers is communicatively coupled to the processing engine for processing the substantially cancelled said first digital signal stream comprising the second number of bits.

10. The mobile handset of claim 9, wherein the processing finger of said one or more processing fingers comprises a spreading code generator configured for generating at least one code of the one or more interfering signals and for transferring said at least one code to the processing engine.

11. The mobile handset of claim 9, wherein the processing finger of said one or more processing fingers comprises a tracking element configured for receiving and tracking the substantially cancelled said first digital signal stream comprising the second number of bits.

12. The mobile handset of claim 9, wherein the processing finger of said one or more processing fingers comprises a correlator configured for demodulating the substantially cancelled said first digital signal stream comprising the second number of bits.

13. The mobile handset of claim 9, wherein the processing engine comprises a canceller configured for generating a cancellation operator from the interference matrix and for applying the cancellation operator to the first digital signal stream to generate the substantially cancelled said first digital signal stream.

14. The mobile handset of claim 13, wherein the cancellation operator comprises a projection operator configured for projecting the first digital stream onto a subspace substantially orthogonal to the one or more interfering signals.

15. The mobile handset of claim 14, wherein the projection operator substantially comprises the form:

$$P_S^\perp = I - S(S^T S)^{-1} S^T,$$

where $P_S^\perp$ is the projection operator, I is an identity matrix, S is the interference matrix and $S^T$ is a transpose of S.

16. The mobile handset of claim 9, wherein the discretizer comprises:
    a first analog to digital converter configured for generating the first digital signal stream with the first number of bits; and
    a second analog to digital converter configured for generating the second digital signal stream with the second number of bits.

17. The mobile handset of claim 16, wherein the discretizer further comprises a first gain controller communicatively coupled to the first analog to digital converter and configured for adjusting gain of the first digital signal stream.

18. The mobile handset of claim 16, wherein the discretizer further comprises a second gain controller communicatively coupled to the second analog to digital converter and configured for adjusting gain of the second digital signal stream.

19. The mobile handset of claim 18, wherein the first number of bits is greater than the second number of bits.

20. The mobile handset of claim 9, wherein the processing engine comprises a gain configured for scaling a substantially cancelled said first digital signal stream to comprise the second number of bits.

21. A method of performing signal cancellation within a receiver, comprising:
    receiving an analog signal;
    sampling the analog signal at a first resolution to generate a first digital signal;
    sampling the analog signal at a second resolution to generate a second digital signal;
    generating an interference code from the first digital signal; and
    using the interference code to substantially cancel an interfering signal from the second digital signal, wherein using the interference code comprises generating an interference matrix from the interference code.

22. The method of claim 21, further comprising generating a cancellation operator from the interference code.

23. The method of claim 22, wherein generating the cancellation operator comprises generating a projection operator configured for projecting the second digital signal onto a subspace that is substantially orthogonal to the interfering signal.

24. The method of claim 23, wherein generating the projection operator comprises generating the projection operator substantially according to the form:

$$P_S^\perp = I - S(S^T S)^{-1} S^T,$$

where $P_S^\perp$ the projection operator, I is an identity matrix, S is an interference matrix and $S^T$ is a transpose of S.

25. The method of claim 21, further comprising sampling the second digital signal at the first resolution in response to using the interference code to substantially cancel the interfering signal.

26. The method of claim 25, further comprising processing the second digital signal to extract information in response to sampling the second digital signal at the first resolution.

27. The method of claim 26, wherein processing the second digital signal comprises correlating the second digital signal to demodulate the second digital signal.

28. The method of claim 21, further comprising transferring the first digital signal to at least one processing finger of a receiver to generate one or more interference codes.

29. The method of claim 28, further comprising transferring the second digital signal to a processing engine of a receiver to substantially cancel one or more interfering signals of the second digital signal using said one or more interference codes.

30. A method of improving data extraction of a receiver, comprising:
    receiving an analog signal;
    sampling the analog signal at a first resolution to generate a first digital signal;
    sampling the analog signal at a second resolution to generate a second digital signal;
    processing the first digital signal with a processing finger of the receiver to generate a code of an interfering signal;
    transferring the code of the interfering signal to a processing engine of the receiver to generate an interference matrix;
    generating a cancellation operator from the interference matrix;
    applying the cancellation operator to the second digital signal to cancel the interfering signal from the second digital signal to generate a substantially interference cancelled signal; and
    scaling the substantially interference cancelled signal to configure the substantially interference cancelled signal with a number of bits of the first digital signal; and
    processing the substantially interference cancelled signal with the processing finger of the receiver to extract data in response to scaling the substantially interference cancelled signal.

31. A receiver, comprising:
    a discretizer configured for generating first and second digital signals from a received analog signal, wherein the first and the second digital signals comprises respective first and second numbers of bits;
    a processing engine communicatively coupled to the discretizer and configured for substantially canceling one or more interfering signals of the second digital signal, wherein the processing engine comprises a matrix generator configured for using a code of said one or more interfering signals to generate an interference matrix; and
    at least one processing finger configured for processing either the first digital signal or the second digital signal after substantial cancellation of the one or more interfering signals.

32. The receiver of claim 31, wherein the receiver is configurable with either or both of a handset and a base station.

33. The receiver of claim 31, wherein said at least one processing finger comprises a spreading code generator configured for generating, from the first digital signal, a code of an interfering signal of said one or more interfering signals.

34. The receiver of claim 31, wherein the processing engine comprises a signal canceller configured for generating a cancellation operator from the interference matrix.

35. The receiver of claim 34, wherein the cancellation operator comprises a projection operator configured for projecting the second digital signal onto a subspace substantially orthogonal to a subspace of the one or more interfering signals.

36. The receiver of claim 35, wherein the projection operator substantially comprises the form:

$$P_S^\perp = I - S(S^T S)^{-1} S^T,$$

where $P_S^\perp$ is the projection operator, I is an identity matrix, S is the interference matrix and $S^T$ is a transpose of S.

37. The receiver of claim 31, wherein the processing engine is fuyrther configured for receiving first digital signal and for canceling said one or more interfering signals from the first digital signal to generate a substantially cancelled first digital signal.

38. The receiver of claim 37, wherein the processing engine comprises a selector configured for selecting and transferring either the substantially cancelled said first digital signal or the second digital signal to said at least one processing finger.

39. A system for performing signal cancellation within a receiver, comprising:
    means for receiving an analog signal;
    means for sampling the analog signal at a first resolution to generate a first digital signal;

means for sampling the analog signal at a second resolution to generate a second digital signal;

means for generating a cancellation operator from the first digital signal, wherein the means for generating the cancellation operator comprises means for generating an interference matrix from an interference code; and means for using the cancellation operator to substantially cancel an interfering signal from the second digital signal.

40. The system of claim 39, wherein the means for generating a cancellation operator from the interference code comprises means for generating the interference code.

41. The system of claim 39, wherein the means for generating the cancellation operator comprises means for generating a projection operator configured for projecting a second digital signal onto a subspace that is substantially orthogonal to a subspace of the interfering signal.

42. The system of claim 41, wherein the means for generating the projection operator comprises means for generating the projection operator substantially according to the form:

$$P_S^\perp = I - S(S^T S)^{-1} S^T,$$

where $P_S^\perp$ is the projection operator, I is an identity matrix, S is an interference matrix and $S^T$ is a transpose of S.

43. The system of claim 39, further comprising means for sampling the second digital signal at the first resolution in response to using the cancellation operator to substantially cancel the interfering signal.

44. The system of claim 43, further means for comprising processing the second digital signal to extract information in response to sampling the second digital signal at the first resolution.

45. The system of claim 44, wherein the means for processing the second digital signal comprises means for correlating the second digital signal to demodulate the second digital signal.

46. The system of claim 39, further comprising means for transferring the first digital signal to at least one processing finger of a receiver to generate one or more interference codes.

47. The system of claim 46, further comprising means for transferring the second digital signal to a processing engine of a receiver to substantially cancel one or more interfering signals of the second digital signal using said one or more interference codes.

48. A system of improving data recovery of a receiver, comprising:

means for receiving an analog signal;

means for sampling the analog signal at a first resolution to generate a first digital signal;

means for sampling the analog signal at a second resolution to generate a second digital signal;

means for processing the first digital signal with a processing finger of the receiver to generate a code of an interfering signal;

means for transferring the code of the interfering signal to a processing engine of the receiver to generate an interference matrix;

means for generating a cancellation operator from the interference matrix;

means for applying the cancellation operator to the second digital signal to cancel the interfering signal from the second digital signal to generate a substantially interference cancelled signal; and means for scaling the substantially interference cancelled signal to configure the substantially interference cancelled signal with a number of bits of the first digital signal; and means for processing the substantially interference cancelled signal with a processing finger of the receiver to extract data in response to scaling the substantially interference cancelled signal.

* * * * *